(12) United States Patent
Takeuchi et al.

(10) Patent No.: US 7,756,417 B2
(45) Date of Patent: Jul. 13, 2010

(54) LIGHT-TRANSMITTING APPARATUS AND WAVELENGTH-DIVISION-MULTIPLEXING COMMUNICATION SYSTEM HAVING OPTICAL-SIGNAL-ABNORMALITY-DETECTING FUNCTION

(75) Inventors: Susumu Takeuchi, Kawasaki (JP); Masato Nagayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 897 days.

(21) Appl. No.: 10/045,093

(22) Filed: Jan. 15, 2002

(65) Prior Publication Data
US 2002/0171889 A1    Nov. 21, 2002

(30) Foreign Application Priority Data
May 16, 2001    (JP)    ............................. 2001-145853

(51) Int. Cl.
*H04B 10/00*    (2006.01)
(52) U.S. Cl. .............................. 398/17; 398/33; 398/34; 398/158
(58) Field of Classification Search ......... 398/182–214, 398/158
See application file for complete search history.

(56) References Cited

U.S. PATENT DOCUMENTS

| | | | | |
|---|---|---|---|---|
| 5,150,368 A | * | 9/1992 | Autruong et al. | ............. 714/747 |
| 5,387,992 A | * | 2/1995 | Miyazaki et al. | ............... 398/95 |
| 5,870,217 A | * | 2/1999 | Itou et al. | ...................... 398/97 |
| 5,894,362 A | | 4/1999 | Onaka et al. | |
| 6,005,995 A | * | 12/1999 | Chen et al. | .................... 385/24 |
| 6,195,480 B1 | * | 2/2001 | Kosaka et al. | .................. 385/24 |
| 6,314,217 B1 | * | 11/2001 | Kosaka et al. | .................. 385/24 |
| 6,392,769 B1 | * | 5/2002 | Ford et al. | ...................... 398/9 |
| 6,469,812 B2 | * | 10/2002 | McKiel, Jr. | ..................... 398/9 |
| 6,580,531 B1 | * | 6/2003 | Swanson et al. | ............... 398/5 |
| 6,600,581 B1 | * | 7/2003 | Fatehi et al. | ..................... 398/9 |
| 6,735,395 B1 | * | 5/2004 | Bai | .............................. 398/95 |
| 6,766,115 B1 | * | 7/2004 | Sorin et al. | .................. 398/161 |
| 6,941,079 B1 | * | 9/2005 | Barozzi et al. | .............. 398/157 |
| 6,941,081 B2 | * | 9/2005 | Moeller et al. | .............. 398/205 |

FOREIGN PATENT DOCUMENTS

| | | |
|---|---|---|
| JP | 8-321825 | 12/1996 |
| JP | 9-83489 | 3/1997 |
| JP | 10-65624 | 3/1998 |
| JP | 11234212 A | 8/1999 |
| JP | 11-346202 | 12/1999 |

* cited by examiner

*Primary Examiner*—Agustin Bello
(74) *Attorney, Agent, or Firm*—Staas & Halsey LLP

(57) ABSTRACT

A light-transmitting apparatus for demultiplexing an input signal completing waveform division multiplexing into wavelength components and transmitting the wavelength components through their respective transmission lines includes a wavelength-count-detecting unit for detecting the number of wavelengths of wavelength components included in the input signal and determining whether the number of wavelengths is normal or abnormal. The light-transmitting apparatus further includes a plurality of identifier-detecting units each associated with one of the wavelength components and used for determining whether or not an identifier set in one of the wavelength components that has the associated wavelength is normal, and a judgment unit for forming a judgment on existence of an error for each of the wavelength components on the basis of a detection result output by the wavelength-count-detecting unit and a detection result output by the identifier-detecting unit associated with the wavelength component.

12 Claims, 22 Drawing Sheets

| Wavelength count | ID | Alarm output |
|---|---|---|
| 0 | 0 | None |
| 0 | 1 | ID error |
| 1 | 0 | Optical input down |
| 1 | 1 | Optical input down |

Wavelength count (Normal : 0, error : 1)
ID (Normal : 0, ID error : 1)

| Comparison result | ID | Alarm output |
|---|---|---|
| 0 | 0 | None |
| 0 | 1 | ID error |
| 1 | 0 | Optical input down |
| 1 | 1 | Optical input down |

Comparison result (Normal : 0, big power difference : 1)
ID (Normal : 0, ID error : 1)

| Light power | ID | Alarm output |
|---|---|---|
| 0 | 0 | None |
| 0 | 1 | Signal degrade |
| 1 | 0 | Optical output down |
| 1 | 1 | Optical output down |

Light power (Normal : 0, abnormal : 1)
OSNR (Normal : 0, abnormal : 1)

FIG. 22

| Light power | ID | Alarm output |
|---|---|---|
| 0 | 0 | None |
| 0 | 1 | Signal degrade |
| 1 | 0 | Optical output down |
| 1 | 1 | Optical output down |

Light power (Normal : 0, abnormal : 1)
OSNR (Normal : 0, abnormal : 1)

LIGHT-TRANSMITTING APPARATUS AND WAVELENGTH-DIVISION-MULTIPLEXING COMMUNICATION SYSTEM HAVING OPTICAL-SIGNAL-ABNORMALITY-DETECTING FUNCTION

BACKGROUND OF THE INVENTION

1. Field of the Invention

In general, the present invention relates to wavelength division multiplexing using a plurality of signal lights having wavelengths different from each other. More particularly, the present invention relates to a light-transmitting apparatus applied to the wavelength division multiplexing and a wavelength-division-multiplexing (WDM) communication system.

2. Description of the Related Art

With extremely rapid popularization of the Internet all over the world in recent years, increasing the capacity of a communication system becomes important. In the initial WDM (wavelength division multiplexing), about 4 to 8 channels separated from each other by a wavelength interval corresponding to a frequency interval of about 200 GHz are multiplexed. In recent years, however, multiplexing of about 16 to 40 channels separated from each other by a wavelength interval corresponding to a frequency interval of about 100 GHz is normal multiplexing. Furthermore, multiplexing of up to 100 channels separated from each other by a wavelength interval corresponding to a frequency interval of about 50 GHz is taken into consideration. In a first line line terminal equipment in a wavelength-division-multiplexing communication system, a receiving unit (TRIB (tributary)) of each channel receives a signal from a transmission line and converts the signal into an optical signal with a proper wavelength. Then, the optical signal is subjected to WDM in a multiplexer (MUX) prior to transmission through an optical transmission line. The WDM signal light passes through the optical transmission line and relay apparatuses and is received by a second line terminal equipment serving as a partner equipment.

A demultiplexer DMUX employed in the second line terminal equipment demultiplexes the WDM signal light into components having wavelengths different from each other, and transmits each of the wavelength components from a transmitting unit (TRIB) of a channel for transmission of the wavelength component being transmitted to a proper transmission line. Each channel of the first line terminal equipment is associated with the second line terminal equipment's channel for receiving data transmitted by the channel of the first line terminal equipment on a 1-with-1 basis. In addition, each TRIB of the transmitting channel in the first line terminal equipment is also associated with the second line terminal equipment's TRIB for a receiving channel provided for transmission of an optical signal having the transmitting channel on a 1-with-1 basis too. Thus, in order to avoid incorrect connection to a TRIB cable for the channel of the second line terminal equipment, typically, an ID for the channel is inserted into the header of an STM-64 frame of each wavelength component and transmitted along with the WDM signal. The TRIB employed in the second line terminal equipment examines the ID of a received frame to form a judgment as to whether or not the ID is correct and outputs an ID-error signal in case the ID is found incorrect. With the conventional wavelength interval, the demultiplexer employed in the second line terminal equipment is capable of demultiplexing the WDM signal light completely so that, in case the optical signal of a wavelength component of the first line terminal equipment is missed, the second line terminal equipment will not incorrectly detect another optical signal as the missed optical signal. In addition, since the number of wavelengths or the number of channels is small, it is easy to verify whether or not a normal signal has been exchanged by monitoring signals for all the wavelengths. Furthermore, there is also no problem raised in generation of an alarm based on only information on the power of a light.

Nevertheless, the conventional light-transmitting apparatus has the following problems.

1: FIGS. 23A to 23C are each a diagram showing normal reception. On the other hand, FIGS. 24A to 24C are each a diagram showing reception with the signal of channel 2 missed. FIG. 23A is a diagram showing a spectrum of a received signal. FIG. 23B is a diagram showing a spectrum of a received signal of channel 2. FIG. 23C is a diagram showing a post-amplification spectrum of a received signal of channel 2. FIG. 24A is a diagram showing a spectrum of a received signal with the signal of channel 2 missed. FIG. 24B is a diagram showing a spectrum of a received signal of channel 2. FIG. 24C is a diagram showing a post-amplification spectrum of a received signal of channel 2. The spectrums shown in FIGS. 23A and 24A each exhibit differences in level among channels. These differences are caused by differences in attenuation among channel signals provided that a relay apparatus 28 or the like transmits optical signals of all channels at a uniform level. In turn, the differences in attenuation among channel signals are caused by dependence on channel wavelengths which are different from each other.

As the number of different wavelengths is increased and, hence, the wavelength interval decreases as shown in FIGS. 23A and 24A, the demultiplexer of the second line terminal equipment is conceivably no longer capable of effectively demultiplexing a WDM signal light due to limitation on a characteristic of the demultiplexer. In such a condition on the receiving equipment, a signal of a particular channel is not completely filtered out from a signal of a channel adjacent to the particular channel, remaining as a residual signal in the adjacent channel. In the case of the spectrum shown in FIG. 23B, for example, signals of channels 1 and 3 remains as residual signals in channel 2. In the case of the spectrum shown in FIG. 24B, on the other hand, a residual signal remains in channel 3. Thus, in the case of normal reception like the one shown in FIGS. 23A to 23C, no problem is raised since main signals of all channels are amplified as shown in FIG. 23C. In the case of the abnormal reception wherein the main signal of channel 2 is missed as shown in FIGS. 24A to 24C, on the other hand, it is quite within the bounds of possibility that the main signal of channel 2 remains as a residual signal in channel 3. The residual signal is incorrectly detected as a main signal of channel 3 and inevitably amplified to a certain level on the receiving equipment as shown in FIG. 24C. In a transmitting line terminal equipment, however, an ID number is assigned to each channel and stored in the header of a frame of an optical signal transmitted through the channel as described above so that the TRIB on the receiving line terminal equipment is capable of comparing the ID stored in the header with an ID assigned to the channel in order to detect an ID error, that is, an ID mismatch between the optical signal and the channel for transmission of the signal, and, hence, to avoid a main signal from being incorrectly recognized. However, an ID error is detected only to point out incorrect connection of a cable. Even in the case of a missed main signal, however, an ID error may also be detected due to the missed signal remaining as a residual signal in an adjacent channel as described above. For example, the missed signal of channel 2 remains as a residual signal in channel 3 and is amplified in the TRIB as a main signal as shown in FIG. 24C. Thus, an ID error may indicate incorrect connection of a cable or a missed optical signal. As a result, an ID error indicating incorrect connection of a cable cannot be distinguished from an ID error indicating a missed optical signal, causing some fear of confusion in maintenance work.

2: As the number of different wavelengths and, hence, the number of channels assigned to the different wavelengths increases, it is also becoming no longer easy to individually monitor signals having the wavelengths different from each other in order to confirm normal reception of the signals. That is to say, there is raised a problem of maintainability. Traditionally, only the power of each transmitted signal light is detected and an alarm is issued to indicate a problem in the detected power.

FIG. 25A is a diagram showing a spectrum of a normal-power and normal-OSNR (Optical Signal Noise Ratio) optical signal transmitted through transmission channel 1 of the TRIB of the first line terminal equipment. FIG. 25B is a diagram showing a power spectrum of a normal-power and normal-OSNR optical signal transmitted through transmission channel 2 of the TRIB of the first line terminal equipment. FIG. 25C is a diagram showing a power spectrum of a transmitted optical signal obtained as a result of a synthesis of the signals transmitted through transmission channels 1 and 2. FIG. 26A is a diagram showing a power spectrum of a normal-power and normal-OSNR (Optical Signal Noise Ratio) optical signal transmitted through transmission channel 1 of the TRIB of the first line terminal equipment. FIG. 26B is a diagram showing a power spectrum of a normal-power and abnormal-OSNR optical signal transmitted through transmission channel 2 of the TRIB of the first line terminal equipment. FIG. 26C is a diagram showing a power spectrum of a transmitted optical signal obtained as a result of a synthesis of the signals transmitted through transmission channels 1 and 2. An OSNR is a ratio of the level of a main signal transmitted through a channel to the level of a noise introduced to the main signal during the transmission through the channel. A normal OSNR is an OSNR having a value at least equal to a predetermined one. On the other hand, an abnormal OSNR is an OSNR having a value smaller than the predetermined one.

Now, consider a condition represented by the power spectrum shown in FIG. 26B in which the OSNR for transmission channel 2 is abnormal due to a high level of a noise such as ASE (Amplified Spontaneous Emission). The high level of the noise can also be caused by typically degrade of a cable connected to the TRIB. By merely taking the power of the light into consideration, a total power of the main signal transmitted through the transmission channel and the noise introduced during the transmission will be detected so that the signal will be determined to be normal even in such a condition. This is because a total level representing the sum of the levels of the noise and the main signal indicates a power at least greater than a predetermined value. Thus, the multiplexer MUX will synthesize and transmit the main signal. As a result, the spectrum after the synthesis exhibits actually a small power for the main signal of transmission channel 2 as shown in FIG. 26C even if the total level has been determined to be normal.

Assume that the second line terminal equipment is capable of correctly accepting the main component of an optical signal with an abnormal OSNR. Even in this case, since the wavelength interval between noises also becomes shorter, a noise mixed with a main signal of a particular transmission channel is added to a noise mixed with a main signal of a transmission channel adjacent to the particular transmission channel, resulting a big resultant noise in the adjacent transmission channel. Thus, the difference between the resultant noise and the main signal becomes very marginal, causing some fear of incorrect detection of the main signal. Such incorrect detection of the main signal will generate an ID error. When an alarm caused by an ID error is output in the second line terminal equipment in such a case, however, it will be difficult to determine the cause of the ID error. As a result, there is raised a maintenance problem.

SUMMARY OF THE INVENTION

It is therefore an object of the present invention addressing the problems described above to provide a light-transmitting apparatus and a wavelength-division-multiplexing communication system which are capable of improving maintainability by avoiding incorrect interpretation of an ID error.

In accordance with an aspect of the present invention, there is provided a light-transmitting apparatus which demultiplexes an input signal completing wavelength division multiplexing into wavelength components with wavelengths different from each other and transmits each of the wavelength components through a transmission line provided for transmission of the wavelength component. The light-transmitting apparatus is characterized by comprising: a wavelength-count-detecting unit for detecting the number of wavelengths of wavelength components included in the input signal and determining whether the number of wavelengths is normal or abnormal; a plurality of identifier-detecting units each associated with one of the wavelength components and used for determining whether or not an identifier set in one of the wavelength components that has the associated wavelength is normal; and a judgment unit for forming a judgment on existence of an error for each of the wavelength components on the basis of a detection result output by the wavelength-count-detecting unit and a detection result output by the identifier-detecting unit associated with the wavelength component.

In accordance with another aspect of the present invention, there is provided a light-transmitting apparatus which demultiplexes an input signal completing wavelength division multiplexing into wavelength components with wavelengths different from each other and transmits each of the wavelength components through a transmission line for the wavelength of the component. The light-transmitting apparatus is characterized by comprising: a power comparator for comparing a light power of each of the wavelength components with a power of another one of the wavelength components to form a judgment as to whether or not the powers of the wavelength components are abnormal; a plurality of identifier-detecting units each associated with one of the wavelength components and used for determining whether or not an identifier set in one of the wavelength components that has the associated wavelength is normal; and a judgment unit for forming a judgment on existence of an error for each of the wavelength components on the basis of a detection result output by the power comparator and a detection result output by the identifier-detecting unit associated with the wavelength component.

In accordance with a further aspect of the present invention, there is provided a wavelength-division-multiplexing communication system including a first line terminal equipment, a second line terminal equipment, a plurality of transmission paths connected to a receiving side of the first line terminal equipment and an optical transmission line connecting the first line terminal equipment to the second line terminal equipment. The wavelength-division-multiplexing communication system is characterized by comprising: a plurality of receiving units provided in the first line terminal equipment and used for receiving input signals having wavelengths different from each other from the respective transmission paths and outputting wavelength components each generated at one of the wavelengths to include an identifier; a multiplexing unit provided in the first line terminal equipment and used for multiplexing signal lights representing the wavelength components output by the receiving units to generate a wavelength-division-multiplexed signal and for transmitting the wavelength-division-multiplexed signal to the second line terminal equipment through the optical transmission line; a wavelength-count-detecting unit provided in the second line terminal equipment and used for detecting the number of wavelengths of wavelength components included in the wavelength-division-multiplexed signal received from the first line terminal equipment through the optical transmission line; a demultiplexing unit provided in the second line terminal equipment and used for demultiplexing the wavelength-division-multiplexed signal received from the first line terminal equipment through the optical transmission line into the wavelength components and for outputting the wavelength components to output terminals; a plurality of identifier-detecting units provided in the second line terminal equipment, each associated with one of the wavelength components and used for determining whether or not an identifier set in a wavelength component having the associated wavelength is normal; and a judgment unit provided in the second line terminal equipment and used for forming a judgment on existence of an error for each of the wavelength components on the basis of a detection result output by the wavelength-count-detecting unit and a detection result output by the identifier-detecting unit associated with the wavelength component.

In accordance with a still further aspect of the present invention, there is provided a wavelength-division-multiplexing communication system including a first line terminal equipment, a second line terminal equipment, a plurality of transmission paths connected to a receiving side of the first line terminal equipment and an optical transmission line connecting the first line terminal equipment to the second line terminal equipment. The wavelength-division-multiplexing communication system is characterized by comprising: a plurality of receiving units provided in the first line terminal equipment and used for receiving input signals having wavelengths different from each other from the respective transmission paths and outputting wavelength components each generated at one of the wavelengths to include an identifier; a multiplexing unit provided in the first line terminal equipment and used for multiplexing signal lights representing the wavelength components output by the receiving units to generate a wavelength-division-multiplexed signal and for transmitting the wavelength-division-multiplexed signal to the second line terminal equipment through the optical transmission line; a power comparator provided in the second line terminal equipment and used for comparing a light power of each of the wavelength components contained in the wavelength-division-multiplexed signal received from the first line terminal equipment through the optical transmission line with a power of another one of the wavelength components to form a judgment as to whether or not the powers of the wavelength components are abnormal; a demultiplexing unit provided in the second line terminal equipment and used for demultiplexing the wavelength-division-multiplexed signal received from the first line terminal equipment through the optical transmission line into the wavelength components and for outputting the wavelength components to output terminals; a plurality of identifier-detecting units provided in the second line terminal equipment, each associated with one of the wavelength components and used for determining whether or not an identifier set in a wavelength component having the associated wavelength is normal; and a judgment unit provided in the second line terminal equipment and used for forming a judgment on existence of an error for each of the wavelength components on the basis of a detection result output by the power comparator and a detection result output by the identifier-detecting unit associated with the wavelength component.

The above and other objects, features and advantages of the present invention as well as the manner of realizing them will become more apparent whereas the invention itself will best be understood from a careful study of the following description and appended claims with reference to attached drawings showing some preferred embodiments of the invention.

BRIEF DESCRIPTION OF THE DRAWINGS

FIG. 22 is a table referred to in a description of alarm control;

DETAILED DESCRIPTION OF THE PREFERRED EMBODIMENTS

Figure 1:
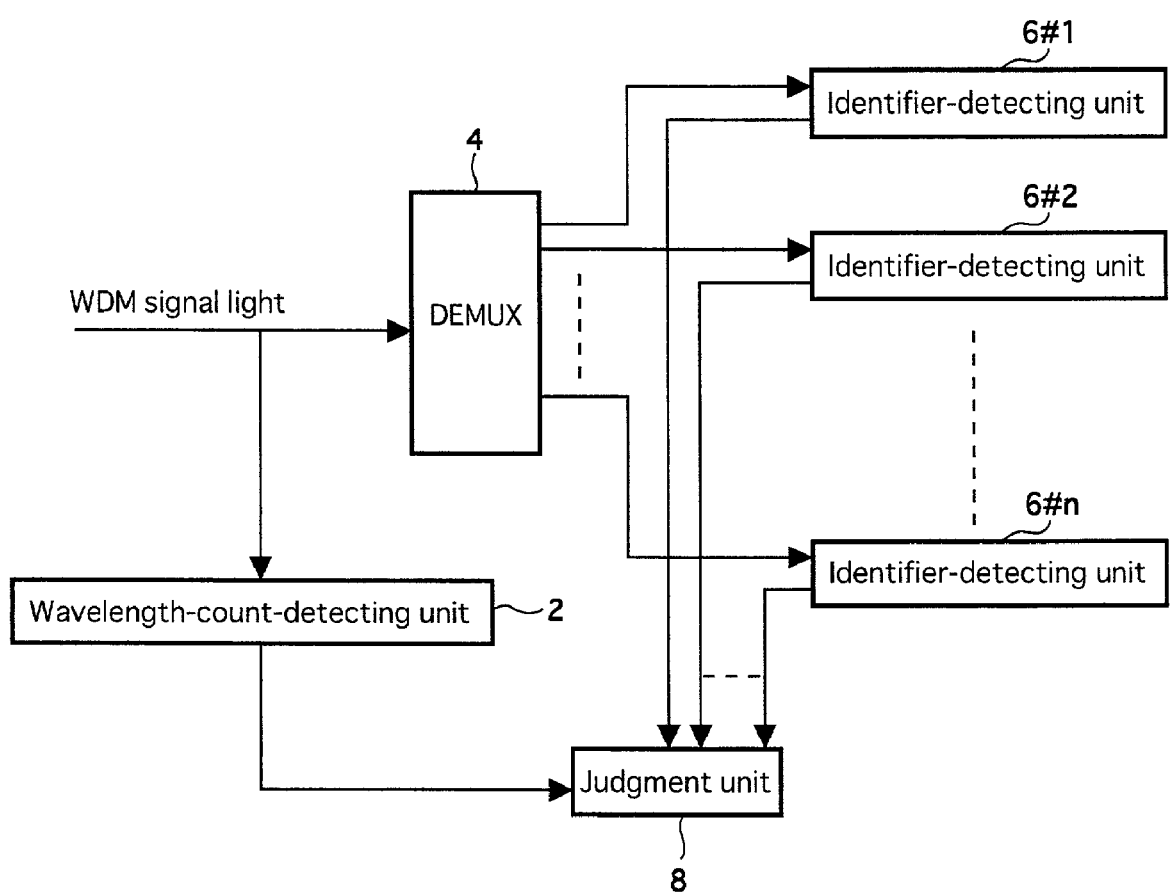
FIG. 1 is a block diagram showing the principle of the present invention.

Be fore preferred embodiments of the present invention are explained, the principle of the invention is described. FIG. 1 is a block diagram showing the principle of the present invention. As shown in FIG. 1, a light-transmitting apparatus comprises a wavelength-count-detecting unit 2, a demultiplexer (DMUX) 4, a plurality of identifier-detecting units 6#i where i=1 to n and a judgment unit 8. The wavelength-count-detecting unit 2 counts the number of wavelengths of wavelength components included in a WDM signal light input from a transmission line. The number of wavelengths of wavelength components included in a WDM signal light should be equal the number of channels which is set in advance. Thus, the number of wavelengths is compared with the number of channels. If the number of wavelengths is smaller than the number of channels, the wavelength-count-detecting unit 2 outputs a signal representing a result of comparison to the judgment unit 8 to indicate that an optical input for any of the channels is down. If the number of wavelengths is equal to the number of channels, on the other hand, the wavelength-count-detecting unit 2 outputs a signal representing a result of comparison to the judgment unit 8 to indicate that optical inputs are normal for all the channels. The demultiplexer 4 demultiplexes the WDM signal light into optical signals of the wavelength components. The identifier-detecting units 6#i where i=1 to n each receive one of the optical signals of the wavelength components and form a judgment as to whether or not an identifier set in the optical signal is correct. The identifier-detecting units 6#i where i=1 to n then each output a signal to the judgment unit 8 to inform the judgment unit 8 of a result of the judgment. The judgment unit 8 forms a judgment as to whether or not each of the wavelength components is normal from the comparison result received from the wavelength-count-detecting unit 2 and the judgment results received from the identifier-detecting units 6#i where i=1 to n. If the comparison result received from the wavelength-count-detecting unit 2 is normal but a judgment result received from the identifier-detecting units 6#i is abnormal, for example, the identifier of a wavelength component received by the identifier-detecting units 6#i is determined to be abnormal. If the comparison result received from the wavelength-count-detecting unit 2 is abnormal, on the other hand, an optical signal of any of the wavelength components is determined to have been down. In this way, an optical signal down of any of the wavelength components can be distinguished from an abnormal identifier of a wavelength component. Thus, no maintenance problem is raised.

First Embodiment

Figure 2:
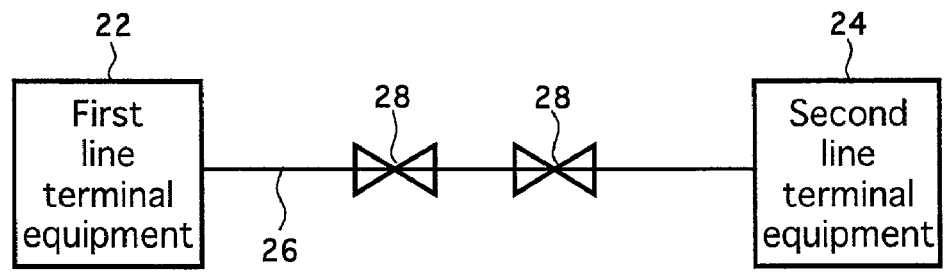
FIG. 2 is a block diagram showing the configuration of a WDM (Wavelength Division Multiplexing) communication system implemented by a first embodiment of the present invention.

FIG. 2 is a block diagram showing the configuration of a wavelength-division-multiplexing communication system implemented by a first embodiment of the present invention. As shown in the figure, the wavelength-division-multiplexing communication system comprises a first line terminal equipment 22, a second line terminal equipment 24, an optical transmission line 26 and relay apparatuses 28. The first line terminal equipment 22 has the following functions:

1: Receive a signal from an input transmission line, set information such as an ID assigned to a channel of the input transmission line in the header of a frame of the signal and output an optical signal at a wavelength assigned to the channel.

2: Multiplex optical signals of channels to generate a WDM signal light and output the WDM signal light to the optical transmission line 26.

The second line terminal equipment 24 has the following functions:

1: Receive a WDM signal light from the optical transmission line 26.

2: Detect the number of wavelengths of wavelength components included in the WDM signal light to form a judgment as to whether or not the number of wavelengths is correct.

3: Demultiplex the WDM signal light into wavelength components having wavelengths λi where i=1 to n.

4: Amplify the wavelength components having wavelengths λi where i=1 to n to optical signals at a predetermined level.

5: Convert the amplified optical signal of each channel into an electrical signal and establish frame synchronization.

6: Examine the ID and the error-correction FEC which are stored in a frame header of each electrical signal to form a judgment as to whether or not the ID and the FEC are correct.
7: Extract a payload of a frame of each electrical signal and output the payload to an output transmission line if the ID and the FEC are found correct.
8: Determine a normal condition, an optical input down or an ID error based on results of detection of IDs for channels and a result of detection of the wavelength count, and output alarm information according to a result of determination.

The optical transmission line 26 is an optical fiber cable for transmitting an optical signal. The relay apparatuses 28 each compensate an optical signal for the optical signal attenuation experienced during transmission.

Figure 3:
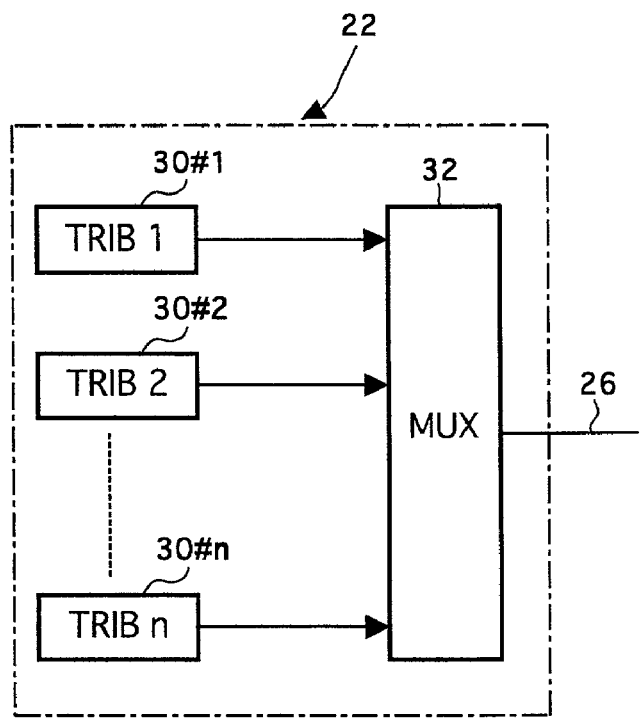
FIG. 3 is a block diagram showing the configuration of a first line terminal equipment employed in the wavelength-division-multiplexing communication system shown in FIG. 2.

FIG. 3 is a block diagram showing the configuration of the first line terminal equipment 22 employed in the wavelength-division-multiplexing communication system shown in FIG. 2. As shown in FIG. 3, the first line terminal equipment 22 comprises a plurality of receiving units (TRIBS) 30#i where i=1 to n and a multiplexer (MUX) 32. Each of the receiving units 30#i where i=1 to n has the following functions:
1: Receive an optical signal from an input transmission line not shown in the figure and convert the optical signal into an electrical signal.
2: Accommodate the received signal in the payload of a frame of the electrical signal.
3: Set an FEC and an ID of a channel assigned to the input transmission line in the header of the frame.
4: Convert the frame of into an optical signal having a wavelength $\lambda i$.

The multiplexer 32 multiplexes optical signals having wavelengths $\lambda i$ where i=1 to n and coming from the receiving units 30#i where i=1 to n respectively to generate a WDM signal light and outputs the WDM signal light to the optical transmission line 26.

Figure 4:
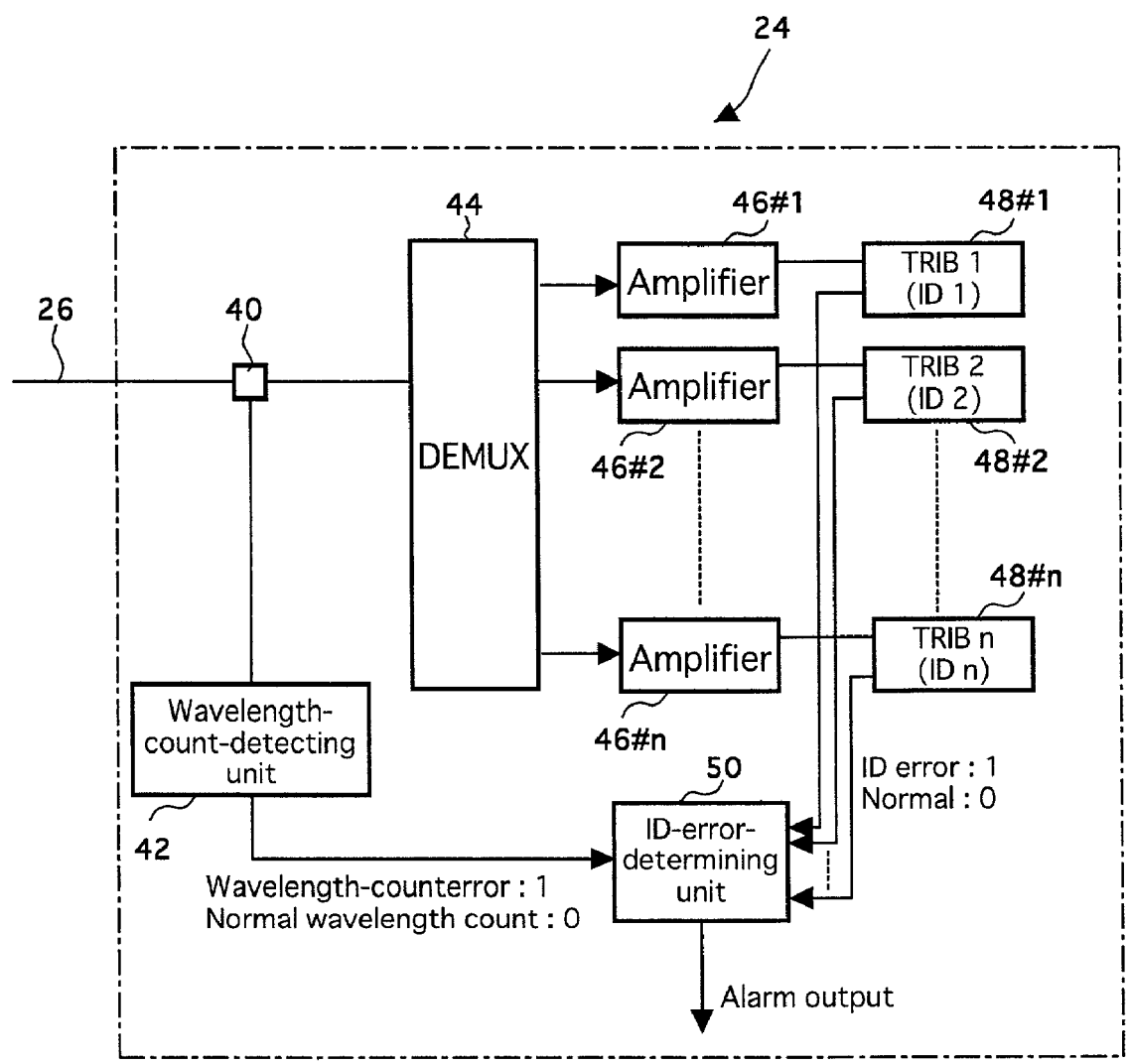
FIG. 4 is a block diagram showing the configuration of a second line terminal equipment employed in the wavelength-division-multiplexing communication system shown in FIG. 2.

FIG. 4 is a block diagram showing the configuration of the second line terminal equipment 24 employed in the wavelength-division-multiplexing communication system shown in FIG. 2. As shown in FIG. 4, the second line terminal equipment 24 comprises a coupler 40, a wavelength-count-detecting unit 42, a demultiplexer (DMUX) 44, amplifiers 46#i where i=1 to n and transmitting units (TRIBS) 48#i where i=1 to n. The coupler 40 splits a WDM signal light into 2 optical signals at a typical predetermined ratio of 10:1. One of the 2 optical signals is supplied to the demultiplexer 44 and the other is fed to the wavelength-count-detecting unit 42. The wavelength-count-detecting unit 42 has the following functions:
1: Form a judgment as to whether or not the level of each of the optical signals with wavelengths $\lambda i$ assigned to channels where i=1 to n exceeds a threshold value. The conventional second line terminal equipment only determines whether or not each of the optical signals with wavelengths $\lambda i$ exists. With the wavelength interval between the optical signals having wavelengths $\lambda i$ becoming smaller, however, an optical signal of a particular channel may include a component of another optical signal of a channel adjacent to the particular channel. Thus, even if the optical signal of the particular channel is down, the existence of the component of another optical signal of a channel adjacent to the particular channel is detected. That is to say, by merely detecting the existence of an optical signal in a channel, it may not be possible to correctly form a judgment as to whether or not the optical signal of the channel is indeed down. For this reason, in this embodiment, the level of each of the optical signals with wavelengths $\lambda i$ assigned to channels where i=1 to n is compared with a threshold value to form a judgment as to whether or not the optical signal of the channel is indeed down. The threshold value is therefore set at a level higher than a sum of levels of noises introduced from adjacent channels.
2: Output a signal having typically a logic value of 0 representing a normal number of wavelengths to indicate that the signal levels of all channels exceed the threshold value.
3: Output a signal having typically a logic value of 1 representing an abnormal number of wavelengths to indicate that the signal level of at least one channel does not exceed the threshold value.

The demultiplexer 44 demultiplexes the WDM signal light into optical signals with wavelengths $\lambda i$ assigned to channels where i=1 to n and outputs the optical signals to their respective amplifiers 46#i where i=1 to n. Each of the amplifiers 46#i compensates the optical signal for the optical signal attenuation experienced during transmission. Each of the transmitting units 48#i has the following functions:
1: Convert the optical signal into an electrical signal.
2: Examine information such as an FEC set in the header of the frame of the electrical signal.
3: Compare an ID set in the header of the frame with an ID assigned to a channel for this transmitting unit 48#i.
3-(i): If the ID set in the header of the frame matches the ID assigned to a channel for itself, output a signal having typically a logic value of 0 to indicate that the ID is normal.
3-(ii): If the ID set in the header of the frame does not match ID assigned to a channel for itself, on the other hand, output a signal having typically a logic value of 1 to indicate that the ID is abnormal.
4: Extract the payload of the frame and convert the payload into an optical signal.
5: Output the optical signal to an output transmission line.

Figure 5:
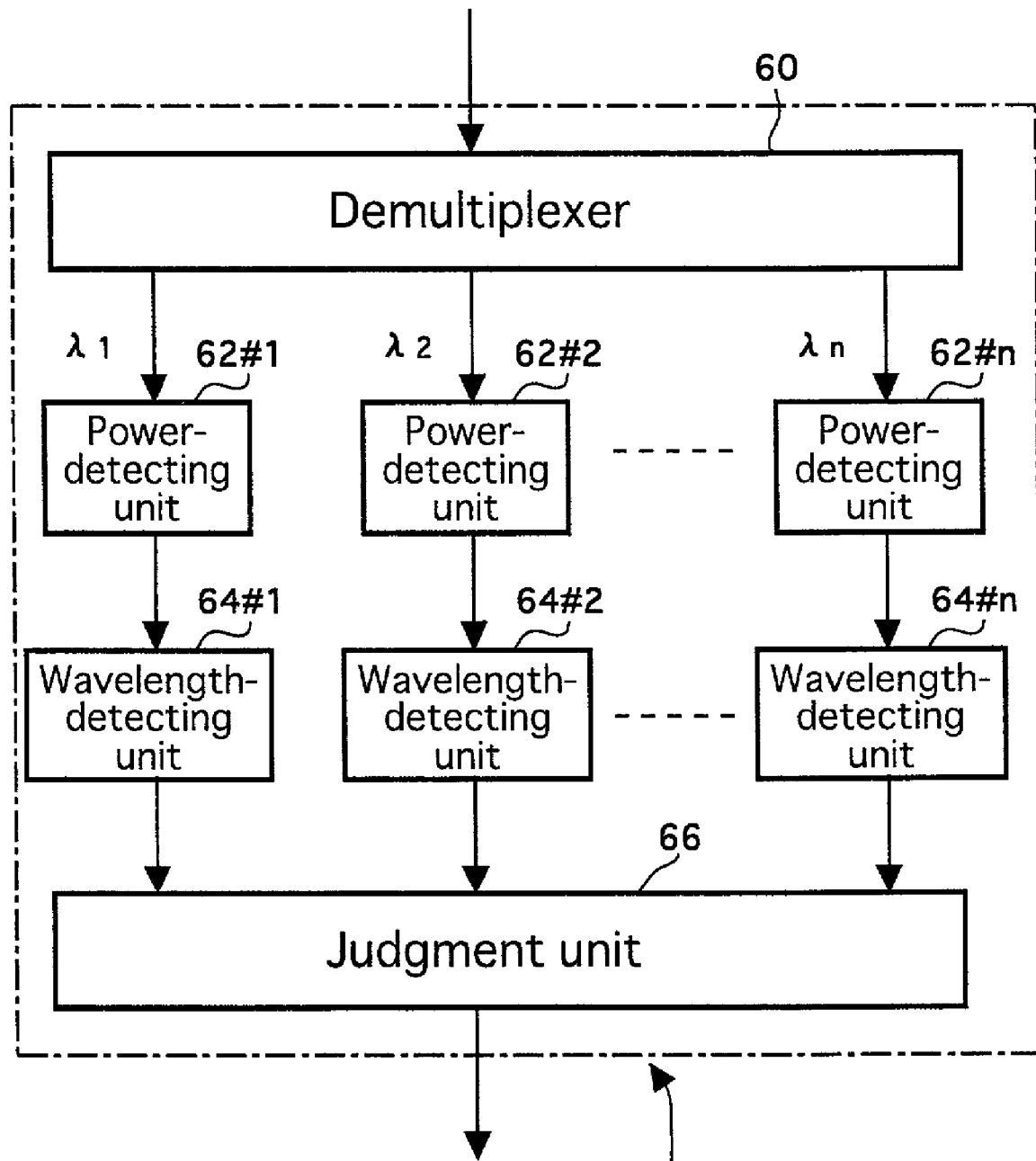
FIG. 5 is a block diagram showing a typical configuration of a wavelength-count-detecting unit employed in the second line terminal equipment shown in FIG. 4.

FIG. 5 is a block diagram showing a typical configuration of the wavelength-count-detecting unit 42 employed in the second line terminal equipment 24 shown in FIG. 4. As shown in FIG. 5, the wavelength-count-detecting unit 42 comprises a demultiplexer 60, power-detecting units 62#i where i=1 to n, wavelength-detecting units 64#i where i=1 to n and a judgment unit 66. The demultiplexer 60 demultiplexes a WDM signal light into optical signals with wavelengths $\lambda i$ where i=1 to n. The power-detecting units 62#i where i=1 to n convert the optical signals with wavelengths $\lambda i$ where i=1 to n respectively into electrical signals and detect powers of the electrical signals. The wavelength-detecting units 64#i where i=1 to n compare the optical signals with wavelengths $\lambda i$ where i=1 to n respectively with a threshold value and each output a result of detection as follows:
(i): If the power exceeds the threshold value, the wavelength-detecting unit 64#i outputs a signal indicating that the power of the optical signal with the wavelength $\lambda i$ is normal.
(ii): If the power does not exceed the threshold value, on the other hand, the wavelength-detecting unit 64#i outputs a signal indicating that the power of the optical signal with the wavelength $\lambda i$ is abnormal.

The judgment unit 66 outputs a result of detection of a wavelength count based on the detection results generated by the wavelength-detecting units 64#i where i=1 to n as follows:
(i): If all the wavelength-detecting units 64#i where i=1 to n output normal signals indicating that the optical signals with the wavelengths $\lambda i$ where i=1 to n are all normal, the judgment unit 66 outputs a signal having typically a logic value of 0 indicating that the number of wavelengths is normal.

(ii): If even one of the wavelength-detecting units 64#i where i=1 to n outputs an abnormal signal indicating that one of the optical signals with the wavelength λi where i=1 to n is abnormal, on the other hand, the judgment unit 66 output a signal having typically a logic value of 1 indicating that the number of wavelengths is abnormal.

Instead of demultiplexing the WDM signal light by using the demultiplexer 60, the WDM signal light can also be supplied to a variable optical filter with the peak-output wavelength of its pass band varying over the range of the wavelengths λi where i=1 to n. In this case, the peak-output wavelength of the pass band is varied sequentially from a wavelength to another, and the power of a signal output by the variable optical filter is monitored by a power-detecting unit and compared with the threshold value to form a judgment as to whether or not the number of wavelengths is normal.

Figures 6, 7:
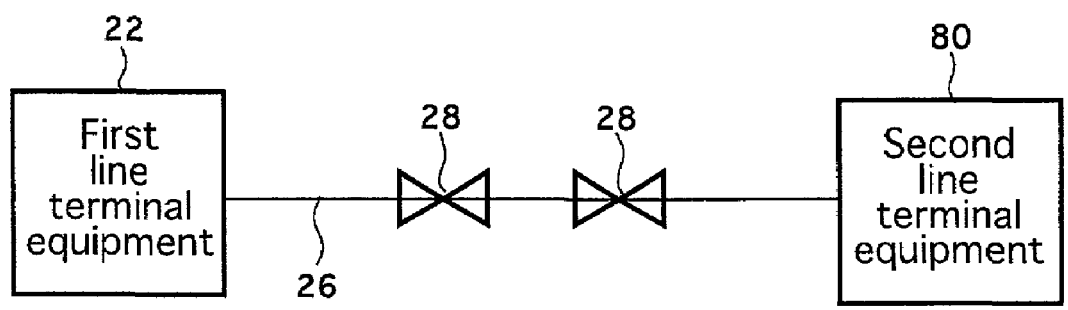
FIG. 6 is a table referred to in a description of a judgment on the existence of an ID error.
FIG. 7 is a block diagram showing the configuration of a wavelength-division-multiplexing communication system implemented by a second embodiment of the present invention.

FIG. 6 is a table used for describing a judgment formed by an ID-error-determining unit 50 to determine whether or not an ID error exists. The ID-error-determining unit 50 forms the judgment based on ID-detection results output by the transmitting units 48#i where i=1 to n and the wavelength-count-detection result output by the wavelength-count-detecting unit 42, and generates an alarm as follows:

(i): If the wavelength-count-detection result output by the wavelength-count-detecting unit 42 indicates that the number of wavelengths is abnormal, the ID-error-determining unit 50 outputs an alarm indicating that an optical input is down as shown on the 2 bottom lines of the table of FIG. 6.

(ii): If the wavelength-count-detection result output by the wavelength-count-detecting unit 42 indicates that the number of wavelengths is normal but an ID-detection result output by the transmitting unit 48#i indicates an ID error, the ID-error-determining unit 50 outputs an alarm indicating the ID error for an optical signal with a wavelength λi assigned to the transmitting unit 48#i as shown on the second line of the table of FIG. 6.

(iii): If the wavelength-count-detection result output by the wavelength-count-detecting unit 42 indicates that the number of wavelengths is normal and the ID-detection results output by the transmitting units 48#i where i=1 to n indicate no ID error, the ID-error-determining unit 50 outputs an OK message.

The operation of the wavelength-division-multiplexing communication system shown in FIG. 2 is explained by referring to FIG. 2 as follows.

1: Data Transmission

First of all, the receiving units 30#i where i=1 to n employed in the first line terminal equipment 22 shown in FIG. 3 each receive an optical signal from an input optical transmission line not shown in the figure, and convert the optical signal into an electrical signal. Each of the receiving units 30#i then inserts data of the received optical signal converted into the electrical signal into the payload of a frame of the electrical signal. In addition, each of the receiving units 30#i also sets a FAW for synchronization, an FEC for error correction and an ID peculiar to a channel assigned to the receiving unit 48#i in the header of the frame. Then, each of the receiving units 30#i converts the frame into an optical signal with a wavelength λi peculiar to the channel and supplies the optical signal to the multiplexer 32. The multiplexer 32 multiplexes the optical signals coming from the receiving units 30#i where i=1 to n and having respectively wavelengths λi where i=1 to n to generate a WDM signal light.

Finally, the multiplexer 32 outputs the WDM signal light to the optical transmission line 26.

2: Data Reception

The WDM signal light transmitted through the optical transmission line 26 by way of the relay apparatuses 28 is received by the second line terminal equipment 24 as shown in FIG. 2. The coupler 40 employed in the second line terminal equipment 24 splits the WDM signal light received from the optical transmission line 26 into 2 optical signals. One of the 2 optical signals is supplied to the demultiplexer 44 and the other is fed to the wavelength-count-detecting unit 42 as shown in FIG. 4. The demultiplexer 44 demultiplexes the WDM signal light into optical signals with wavelengths λi assigned to channels where i=1 to n and outputs the optical signals to their respective amplifiers 46#i where i=1 to n by way of outputs terminals of the demultiplexer 44. Each of the transmitting units 48#i has functions to convert an optical signal received from the amplifier 46#i into an electrical signal, to establish synchronization with the FAW set in the header of a frame converted into the electrical signal, to correct errors by using the FEC set in the header of the frame and to compare the ID set in the header of the frame with an ID assigned to a channel for this transmitting unit 48#i. If the ID set in the header of the frame matches the ID assigned to a channel for itself, the transmitting unit 48#i outputs a signal indicating that the ID is normal to the ID-error-determining unit 50. If the ID set in the header of the frame does not match ID assigned to a channel for itself, on the other hand, the transmitting unit 48#i outputs a signal indicating that the ID is abnormal to the ID-error-determining unit 50.

First of all, the wavelength-count-detecting unit 42 demultiplexes the WDM signal light received from the coupler 40 into optical signals with wavelengths λi assigned to channels where i=1 to n. Then, the wavelength-count-detecting 42 detects powers Pi where i=1 to n of the optical signals with wavelengths λi where i=1 to n and determines whether or not the power Pi exceeds a threshold value. The wavelength-count-detecting unit 42 finally outputs a signal as follows:

(i): The wavelength-count-detecting unit 42 outputs a signal representing a normal wavelength count to indicate that the powers Pi where i=1 to n of all channels exceed the threshold value.

(ii): The wavelength-count-detecting unit 42 outputs a signal representing an abnormal wavelength count to indicate that at least one of the powers Pi where i=1 to n for a wavelength does not exceed the threshold value.

The ID-error-determining unit 50 forms the judgment based on ID-detection results output by the transmitting units 48#i where i=1 to n for channels assigned to the transmitting units 48#i where i=1 to n and based on the wavelength-count-detection result output by the wavelength-count-detecting unit 42, and generates an alarm as follows:

(i): If the wavelength-count-detection result output by the wavelength-count-detecting unit 42 indicates that the number of wavelengths is abnormal, the ID-error-determining unit 50 outputs an alarm indicating that an optical input is down.

(ii): If the wavelength-count-detection result output by the wavelength-count-detecting unit 42 indicates that the number of wavelengths is normal but a result output by a transmitting unit 48#i indicates an ID error, the ID-error-determining unit 50 outputs an alarm indicating the ID error for an optical signal with a wavelength λi assigned to the transmitting unit 48#i.

(iii): If the wavelength-count-detection result output by the wavelength-count-detecting unit 42 indicates that the number of wavelengths is normal and the results output by the transmitting units 48#i where i=1 to n indicate no ID error, the ID-error-determining unit 50 outputs an OK message.

An alarm output by the ID-error-determining unit 50 is supplied to a console connected to the second line terminal equipment 24 or a monitoring apparatus for controlling the second line terminal equipment 24 so that maintenance work based on the alarm can be carried out. An optical input down and an ID error can be distinguished from each other from a displayed alarm. As an example, assume that an alarm indicates an ID error for a channel of the second line terminal equipment 24. In this case, the alarm obviously informs a person in charge of maintenance of an ID error caused typically by incorrect connection of a cable instead of reporting an optical input down. As a result, maintenance confusion can be avoided.

In accordance with the embodiment described above, in the event of an input signal down caused by typically an increased number of wavelengths due to an increased communication capacity in a wavelength-division-multiplexing communication system, it is possible to prevent another most likely misinterpreted input signal from being interpreted incorrectly as the input signal down even if the characteristics of a demultiplexer employed in a equipment on the receiving side are the same as the conventional one so that the maintainability of the wavelength-division-multiplexing communication system can be improved.

Second Embodiment

Figure 23A:
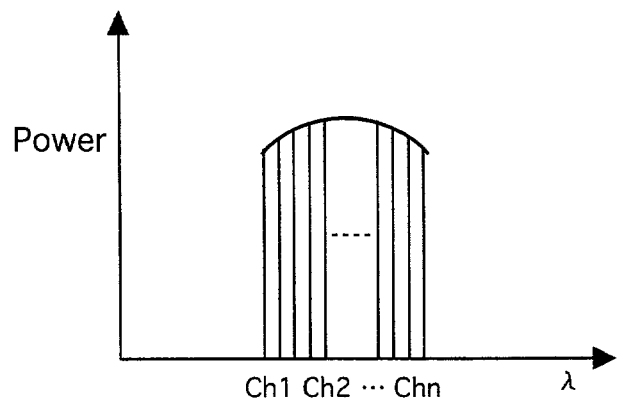
FIG. 23A is a diagram showing a spectrum of a received signal in a normal case.
Figure 23B:
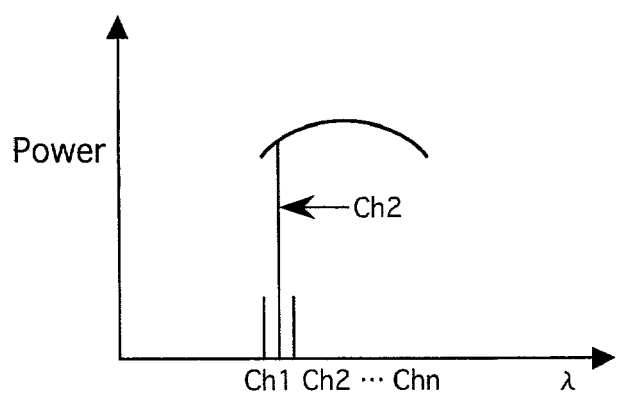
FIG. 23B is a diagram showing a spectrum of a received signal in a normal case.
Figure 23C:
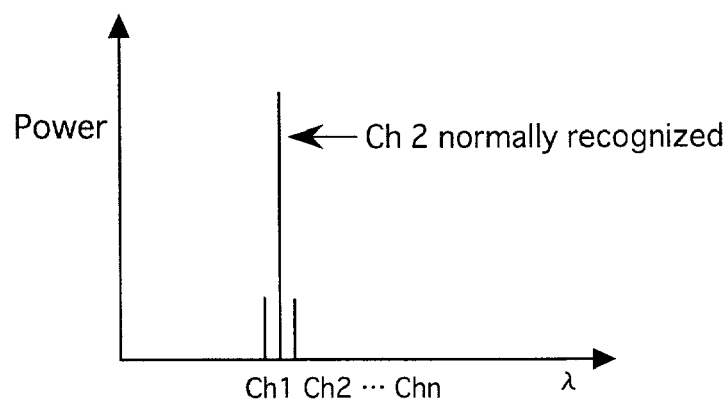
FIG. 23C is a diagram showing a spectrum of a received signal in a normal case.
Figure 24A:
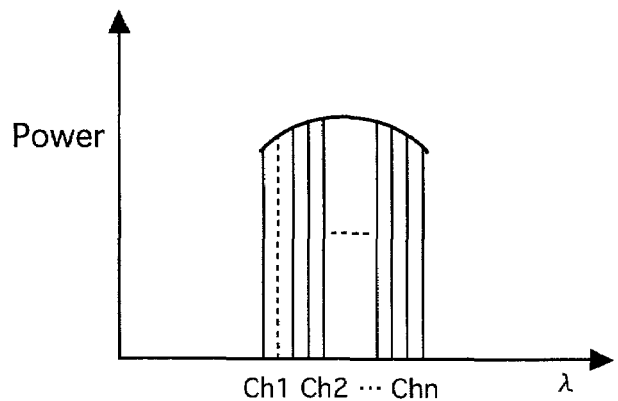
FIG. 24A is a diagram showing a spectrum of a received signal in a channel-signal-down case.
Figure 24B:
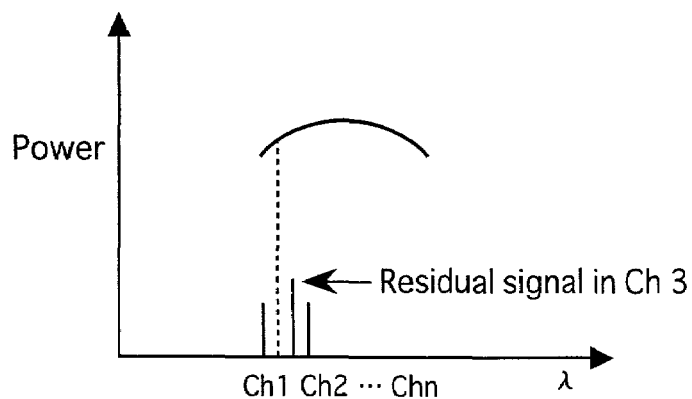
FIG. 24B is a diagram showing a spectrum of a received signal in a channel-signal-down case.
Figure 24C:
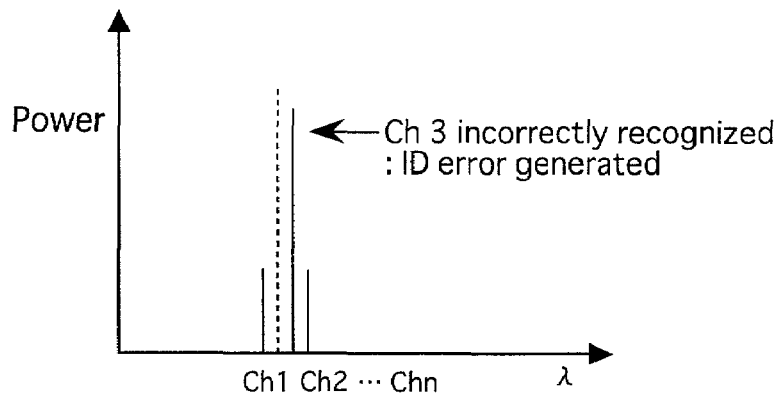
FIG. 24C is a diagram showing a spectrum of a received signal in a channel-signal-down case.
Figure 25A:
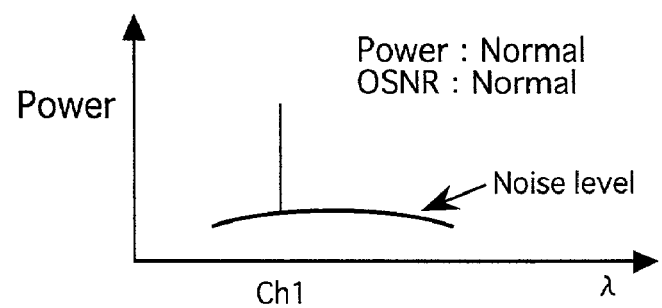
FIG. 25A is a diagram showing a spectrum of a received signal with a normal power and a normal OSNR.
Figure 25B:
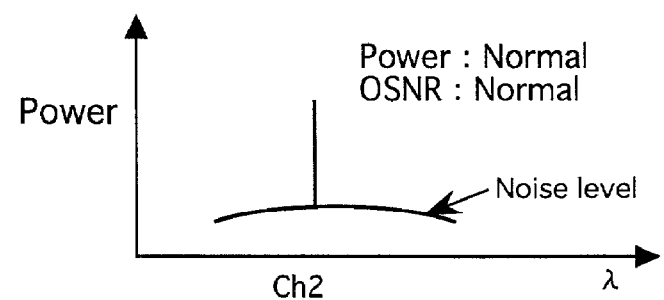
FIG. 25B is a diagram showing a spectrum of a received signal with a normal power and a normal OSNR.
Figure 25C:
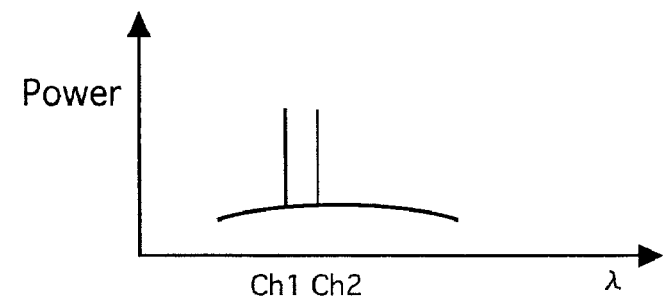
FIG. 25C is a diagram showing a spectrum of a received signal with a normal power and a normal OSNR.
Figure 26A:
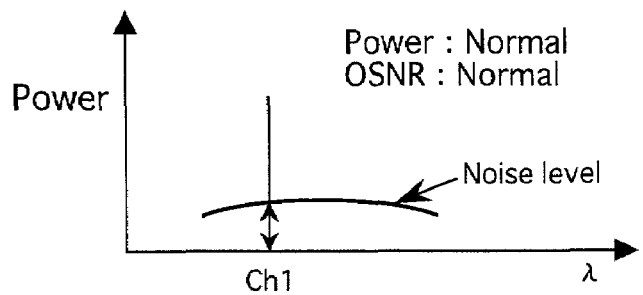
FIG. 26A is a diagram showing a spectrum of a received signal with a normal power and a normal OSNR.
Figure 26B:
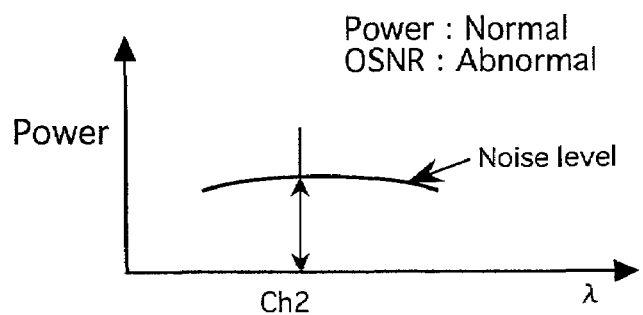
FIG. 26B is a diagram showing a spectrum of a received signal with a normal power and an abnormal OSNR.
Figure 26C:
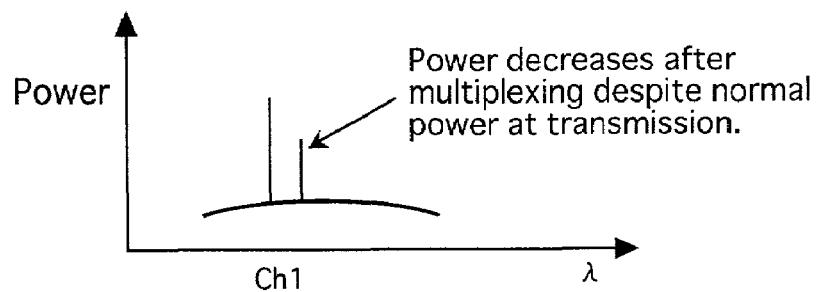
FIG. 26C is a diagram showing a spectrum of a received signal with a normal power and an abnormal OSNR.

FIG. 7 is a block diagram showing the configuration of a wavelength-division-multiplexing communication system implemented by a second embodiment of the present invention. Configuration elements of the second embodiment which are virtually identical with those employed in the first embodiment shown in FIG. 2 are denoted by the same reference numerals as the latter. As shown in the FIG. 7, the wavelength-division-multiplexing communication system comprises the first line terminal equipment 22, a second line terminal equipment 80, the optical transmission line 26 and the relay apparatuses 28. The second line terminal equipment 80 has the following functions:

1: Receive a WDM signal light from the optical transmission line 26.
2: Demultiplex the WDM signal light into optical signals having wavelengths $\lambda i$ assigned to channels where i=1 to n and $\lambda 1 > \lambda 2 > \cdots > \lambda n$.
3: Compare the power of each optical signal having a wavelength $\lambda i$ assigned to a particular channel with the power of an optical signal having a wavelength $\lambda(i+1)$ or $\lambda(i-1)$ assigned to a channel adjacent to the particular channel where i=1 to n, and output signals indicating that the optical signals of the particular channel and the channel adjacent to the particular channel are normal or abnormal. The optical signal of each channel is attenuated by the transmission in accordance with an attenuation characteristic which is dependent on the wavelength as shown in FIGS. 23A and 24A. As the wavelength interval becomes short, there is some fear of a particular channel optical signal including an optical signal of a channel adjacent to the particular channel as a noise as shown in FIGS. 23B and 24B. For these reasons, the power of an optical signal transmitted through a particular channel is compared with the power of an optical signal of a channel adjacent to the particular channel to form a judgment as to whether the optical signals of the particular channel and the channel adjacent to the particular channel are normal or abnormal.
4: Amplify the optical signals having channel wavelengths $\lambda i$ where i=1 to n.
5: Convert the amplified optical signals into electrical signals and establish frame synchronization.
6: Check information stored in each frame header to form a judgment as to whether or not the ID and the FEC which are stored in the header are normal.
7: If the ID and the FEC are normal, extract the payload of each frame and output the payload to an output transmission line provided for the payload.
8: For each channel, form a judgment as to whether the optical signal is normal, is down or has an ID error from a result of detection of its ID and a result of a judgment as to whether the optical input for the wavelength $\lambda i$ assigned to the channel is normal or down, and output an alarm if necessary.

Figure 8:
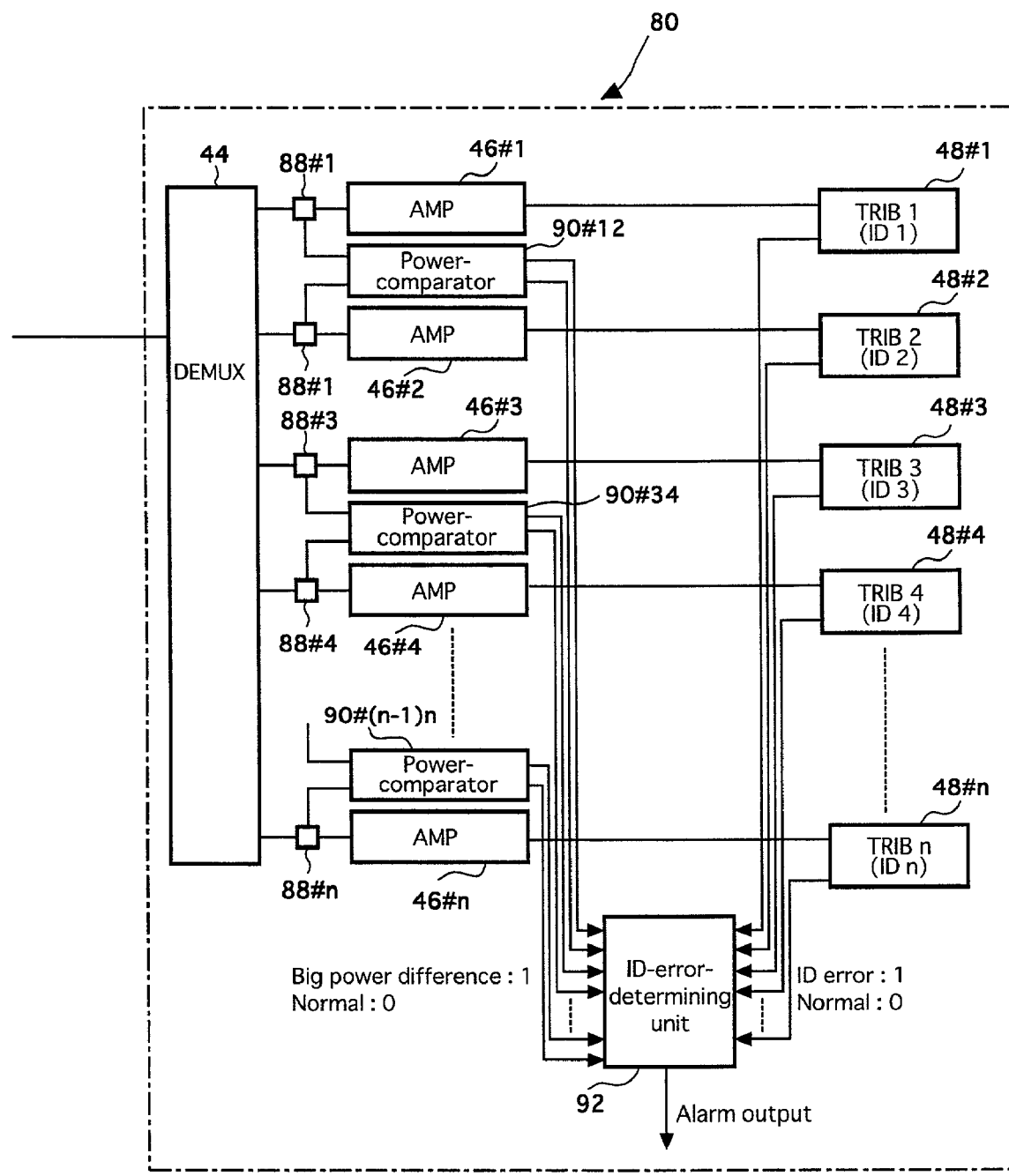
FIG. 8 is a block diagram showing the configuration of a second line terminal equipment employed in the wavelength-division-multiplexing communication system shown in FIG. 7.

FIG. 8 is a block diagram showing the configuration of the second line terminal equipment 80 employed in the wavelength-division-multiplexing communication system shown in FIG. 7. Configuration elements of the second line terminal equipment 80 which are virtually identical with those employed in the second line terminal equipment 24 shown in FIG. 4 are denoted by the same reference numerals as the latter. As shown in FIG. 8, the second line terminal equipment 80 comprises a demultiplexer (DEMUX) 44, amplifiers 46#i where i=1 to n, transmitting units (TRIBS) 48#i where i=1 to n, couplers 88#i where i=1 to n, power comparators 90#2k-1,2k where k=1, 2 and so on and an ID-error-determining unit 92. Each of the couplers 88#i where i=1 to n splits an optical signal into 2 signals which are supplied to the amplifier 46#i and the power comparators 90#i, i+1 or 90#i-1, i respectively. Each of the power comparators 90#2k-1,2k where k=1, 2 and so on compares the power of a channel optical signal with a wavelength $\lambda i$ where i=2k-1 or 2k with the power of a channel optical signal with a wavelength $\lambda i-1$ or $\lambda i$, and outputs a signal indicating that the channel optical signals are normal or abnormal. As an alternative, a power comparator may also compare optical signals with wavelengths $\lambda i$ assigned to 3 or more adjacent channels where i=1 to n. As another alternative, a power comparator can be provided for each of the wavelengths $\lambda i$ where i=1 to n so that a total of n power comparators is required where notation n denotes the number of channels. To make the circuit configuration simple, however, in the second embodiment, a power comparator 90 is provided for every 2 channels so that only n/2 power comparators 90 are required in case n is an even number or only (n+1)/2 power comparators 90 are required in case n is an odd number. In the following description, n is assumed to be an even number for the sake of convenience. It should be noted that, if the number of channels is odd, the power of an optical signal with the shortest wavelength $\lambda n$ is compared with the power of an optical signal with a wavelength $\lambda n-1$ assigned to a channel adjacent to a channel provided for transmission of an optical signal having the shortest wavelength $\lambda n$. A judgment as to whether the optical signals are normal or abnormal is formed typically as follows:

(i): If the difference between the powers or the ratio of one of the powers to the other power is greater than a threshold value, the optical signal having the larger power is determined to be normal while the optical signal having the smaller power is determined to be abnormal.
(ii): If the difference between the powers or the ratio of one of the powers to the other power is smaller than the threshold value, on the other hand, both the optical signals are determined to be normal.

As described above, optical characteristics of optical signals are similar to each other. In addition, optical signals of channels adjacent to each other cannot be separated completely from each other. As a matter of fact, an optical signal of a particular channel may include part of an optical signal of a channel adjacent to the particular channel. For these reasons, the power of an optical signal of a particular channel is compared with the power of an optical signal of a channel adjacent to the particular channel to form a judgment as to whether or not one of the optical signals is down or whether or not the optical signals are normal with a high degree of accuracy.

Figures 9, 10:
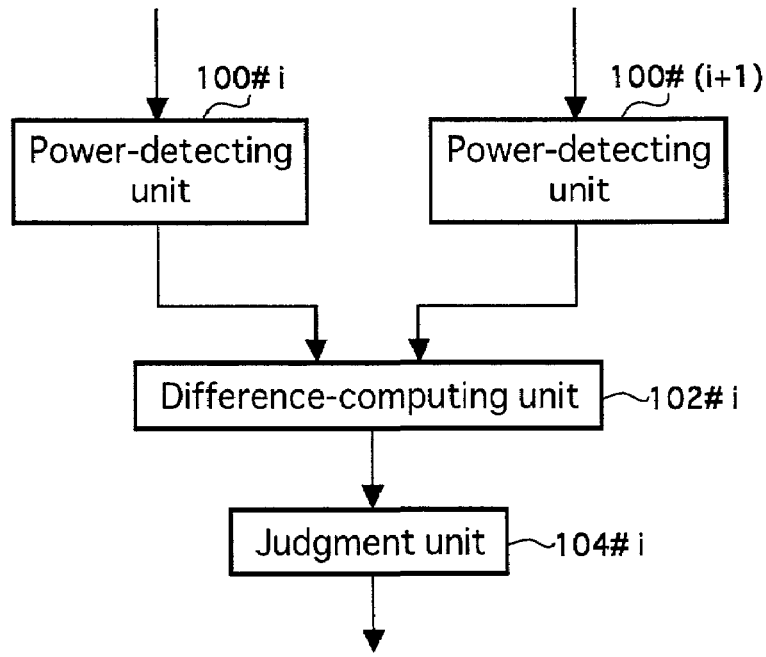
FIG. 9 is a block diagram showing the configuration of a power comparator employed in the second line terminal equipment shown in FIG. 8.
FIG. 10 is a table referred to in a description of a judgment on the existence of an ID error.

FIG. 9 is a block diagram showing the configuration of the power comparator 90#i, i+1 employed in the second line terminal equipment 80 shown in FIG. 8. As shown in FIG. 9, the power comparator 90#i, i+1 comprises power-detecting units 100#i and 100#i+1, a difference-computing unit 102#i and a judgment unit 104#i. The power-detecting unit 100#i detects the power of a channel optical signal with a wavelength $\lambda i$ received from the coupler 88#i. By the same token, the power-detecting unit 100#i+1 detects the power of a channel optical signal with a wavelength $\lambda i+1$ received from the coupler 88#i+1. The difference-computing unit 102#i computes the difference between the power detected by the 100#i for the channel optical signal with the wavelength $\lambda i$ and the power detected by the 100#i+1 for the channel optical signal with the wavelength $\lambda i+1$. The judgment unit 104#i compares the difference between the powers with a threshold value and outputs a result of comparison for the channels provided for transmission of optical signals having the wavelengths $\lambda i$ and $\lambda i+1$ as follows:

(i): If the difference between the powers is greater than the threshold value, the judgment unit 104#i outputs a signal having a logic value of typically 0 to the ID-error-determining unit 92 to indicate that the optical signal having the larger power is normal and another signal having a logic value of typically 1 to the ID-error-determining unit 92 to indicate that the optical signal having the smaller power is abnormal.

(ii): If the difference between the powers is smaller than the threshold value, on the other hand, the judgment unit 104#i outputs both the signals having a logic value of typically 0 to the ID-error-determining unit 92 to indicate that both the optical signals are normal.

FIG. 10 is a table used for describing a judgment formed by the ID-error-determining unit 92 to determine the existence of an ID error. The ID-error-determining unit 92 outputs an alarm based on ID-detection results received from the transmitting units 48#i for channels provided for transmission of optical signals having the wavelengths $\lambda i$ and comparison results received from the power comparators 90#i, i+1 or 90#i-1, i for the channels provided for transmission of optical signals having the wavelengths $\lambda i$ as follows:

(i): If the optical signal of a channel provided for transmission of an optical signal having the wavelength $\lambda i$ is found abnormal as evidenced by typically a comparison result of 1 received from one of the power comparators 90#i, i+1 or 90#i-1, i for the channel, the ID-error-determining unit 92 outputs an alarm indicating that an input of the optical signal for the channel is down as shown on the bottom 2 lines of the table of FIG. 10.

(ii): If the optical signal of a channel provided for transmission of an optical signal having the wavelength $\lambda i$ is found normal as evidenced by typically a comparison result of 0 received from one of the power comparators 90#i, i+1 or 90#i-1, i for the channel but an ID-detection result received from one of the transmitting units 48#i for the channel indicates an ID error, the ID-error-determining unit 92 outputs an alarm indicating that the optical signal for the channel has an ID error as shown on the second line of the table of FIG. 10.

(iii): If the ID-detection results received from the transmitting units 48#i for channels provided for transmission of optical signals having the wavelengths $\lambda i$ are all normal and the comparison results received from the power comparators 90#i, i+1 or 90#i-1, i for all the channels provided for transmission of optical signals having the wavelengths $\lambda i$ indicate no ID errors, the ID-error-determining unit 92 outputs an OK message as shown on the top line of the table of FIG. 10.

The operation of the wavelength-division-multiplexing communication system shown in FIG. 7 is explained as follows.

Much like the first embodiment explained earlier, first of all, the receiving units 30#i where i=1 to n employed in the first line terminal equipment 22 each convert a frame with a header including information such as an ID into an optical signal with a wavelength $\lambda i$ peculiar to the channel, and supplies the optical signal to the multiplexer 32. The multiplexer 32 multiplexes the optical signals received from the receiving units 30#i where i=1 to n at wavelengths $\lambda i$ where i=1 to n and $\lambda 1 > \lambda 2 > \text{----} > \lambda n$ to generate a WDM signal light. Finally, the multiplexer 32 outputs the WDM signal light to the optical transmission line 26.

The WDM signal light transmitted through the optical transmission line 26 by way of the relay apparatuses 28 is received by the second line terminal equipment 80. The demultiplexer 44 employed in the second line terminal equipment 80 demultiplexes the WDM signal light into optical signals with wavelengths $\lambda i$ assigned to channels where i=1 to n and $\lambda 1 > \lambda 2 > \text{----} > \lambda n$, and outputs the optical signals to their respective couplers 88#i assigned to the channels where i=1 to n. Each of the couplers 88#i splits the optical signal light received from the demultiplexer 44 into 2 optical signals. One of the 2 optical signals is supplied to the amplifier 46#i associated with the coupler 88#i and the other is fed to the power comparator 90#i, i+1 or 90#i-1, i associated with the coupler 88#i. Each of the power comparators 90#2k-1, 2k (k=1 to m) detects powers P2k-1 and P2k of the channel optical signals with wavelengths $\lambda 2k-1$ and $\lambda 2k$. Each of the power comparators 90#2k-1, 2k (k=1 to m) then detects a power difference S2k-1 (=P2k-1-P2k) with a threshold value Th. Finally, each of the power comparators 90#2k-1, 2k (k=1 to m) outputs a result of comparison for the channels provided for transmission of optical signals having the wavelengths $\lambda 2k$ and $\lambda 2k-1$ as follows:

(i): If $-\text{Th} < \text{S2k-1} < \text{Th}$, the power comparator 90#2k-1, 2k outputs a signal having a logic value of typically 00 to the ID-error-determining unit 92 to indicate that both the channel optical signals having the wavelengths $\lambda 2k$ and $\lambda 2k-1$ are normal.

(ii): If S2k-1>Th, the power comparator 90#2k-1, 2k outputs a signal having a logic value of typically 01 to the ID-error-determining unit 92 to indicate that the channel optical signal having the wavelength $\lambda 2k-1$ is normal while the channel optical signal having the wavelength $\lambda 2k$ is abnormal.

(iii): If S2k-1<-Th, the power comparator 90#2k-1, 2k outputs a signal having a logic value of typically 10 to the ID-error-determining unit 92 to indicate that the channel optical signal having the wavelength $\lambda 2k-1$ is abnormal while the channel optical signal having the wavelength $\lambda 2k$ is normal.

Much like the first embodiment, each of the transmitting units 48#i has a function to compare an ID set in the header of a frame with an ID assigned to a channel for this transmitting unit 48#i, and outputs a result of comparison to the ID-error-determining unit 92 as follows:

(i): If the ID set in the header of the frame matches the ID assigned to a channel for itself, the transmitting unit 48#i outputs a signal indicating that the ID is normal to the ID-error-determining unit 92.

(ii): If the ID set in the header of the frame does not match ID assigned to a channel for itself, on the other hand, the transmitting unit 48#i outputs a signal indicating an ID error to the ID-error-determining unit 92.

The ID-error-determining unit 92 forms the judgment based on ID-detection results output by the transmitting units 48#i where i=1 to n for channels assigned to the transmitting units 48#i where i=1 to n and based on the power-comparison results output by the 90#i, i+1 or 90#i−1, i where k=1 to m for the channels provided for transmission of optical signals having the wavelengths λi where i=1 to n, and generates an alarm as follows:

(i): If the power-comparison result output by the 90#i, i+1 or 90#i−1, i for the wavelength λi is abnormal, the ID-error-determining unit 92 outputs an alarm indicating that an optical input having the wavelength λi is down.

(ii): If the power-comparison result output by the 90#i, i+1 or 90#i−1, i for the wavelength λi is normal but the ID-detection result output by the transmitting unit 48#i for the wavelength λi indicates an ID error, the ID-error-determining unit 92 outputs an alarm indicating the ID error for the wavelength λi.

(iii): If the power-comparison results output by the 90#i, i+1 or 90#i−1, i where k=1 to m for the wavelength λi where i=1 to n are all normal and the ID-detection results output by the transmitting units 48#i for the wavelength λi where i=1 to n are all also normal as well, the ID-error-determining unit 92 outputs an OK message.

An alarm output by the ID-error-determining unit 92 is supplied to a console connected to the second line terminal equipment 24 or a monitoring apparatus for controlling the second line terminal equipment 24 so that maintenance work based on the alarm can be carried out. As is obvious from the above description, an optical input down and an ID error can be distinguished from each other from a displayed alarm. As a result, maintenance confusion can be avoided.

Third Embodiment

Figure 11:
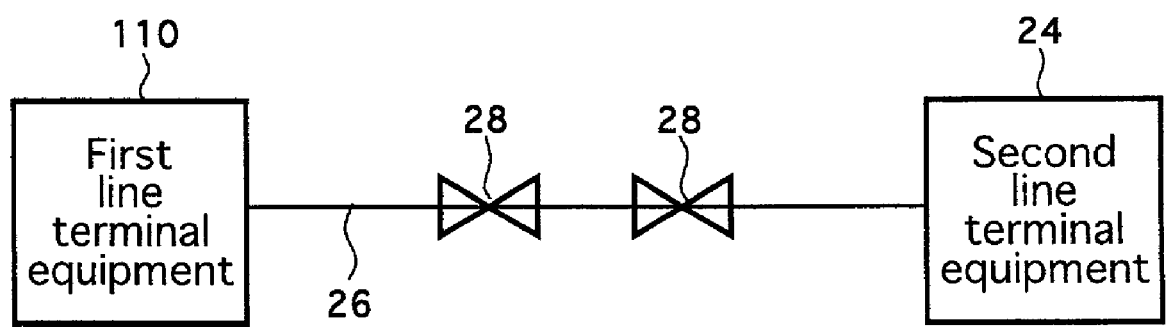
FIG. 11 is a block diagram showing the configuration of a wavelength-division-multiplexing communication system implemented by a third embodiment of the present invention.

FIG. 11 is a block diagram showing the configuration of a wavelength-division-multiplexing communication system implemented by a third embodiment of the present invention. Configuration elements of the third embodiment which are virtually identical with those employed in the first embodiment shown in FIG. 2 are denoted by the same reference numerals as the latter. A first line terminal equipment 110 is different from the first line terminal equipment 22 employed in the first embodiment shown in FIG. 2 in that the first line terminal equipment 110 also outputs an alarm indicating an optical signal degrade indicated by an OSNR for any channel in addition to an alarm indicating an output down of an optical signal received by a receiving unit #30 employed in the first line terminal equipment 110 for any channel. The formation of the judgment on signal degrade is based on an OSNR for the following reason. If only the power of an optical signal received through a channel is examined, the level of the channel optical signal may appear normal, causing an abnormality to remain undetected even if the OSNR of the signal is actually abnormal due to a noise included in the signal because of degrade of the optical cable or the like. A particular channel optical signal having a low OSNR further deteriorates in the second line terminal equipment 24 due to possible inclusion of a noise originated from a channel adjacent to the particular channel in the case a short wavelength interval between channels. This is because, if the wavelength interval between channels becomes short, such a noise may be introduced into the optical signal of the particular channel when the WDM signal light including the optical signal is demultiplexed by the second line terminal equipment 24. The newly introduced noise is added to the noise already existing in the optical signal to become a resultant noise. Thus, the difference between the resultant noise and the main component of the optical signal becomes very marginal even if the second line terminal equipment 24 is capable of receiving the optical signal. Such an extremely marginal difference between the resultant noise and the main component of the optical signal inevitably raises a maintenance problem. In order to solve this problem, the first line terminal equipment 110 detects an OSNR abnormality in advance and outputs an alarm in the event of signal degrade so as to allow causes of the abnormality to be removed prior to transmission.

As shown in FIG. 11, the wavelength-division-multiplexing communication system comprises the first line terminal equipment 110, the second line terminal equipment 24, the optical transmission line 26 and the relay apparatuses 28. In addition to the functions of the first line terminal equipment 22 of the first embodiment shown in FIG. 2, the first line terminal equipment 110 also has the following functions:

1: Detect the power of the optical signal of each channel to form a judgment as to whether the power of the optical signal is normal or abnormal.

2: Form a judgment as to whether the OSNR of each channel optical signal included in the WDM signal light is normal or abnormal.

3: For the optical signal of each channel, form the following judgments:

3-(i): If the power of the optical signal is abnormal, determine that the input for the optical signal is down.

3-(ii): If both the power and the OSNR of the optical signal are normal, determine that the input for the optical signal is normal.

3-(iii): If the power of the optical signal is normal but the OSNR thereof is abnormal, determine that the optical signal has deteriorated.

Figure 12:
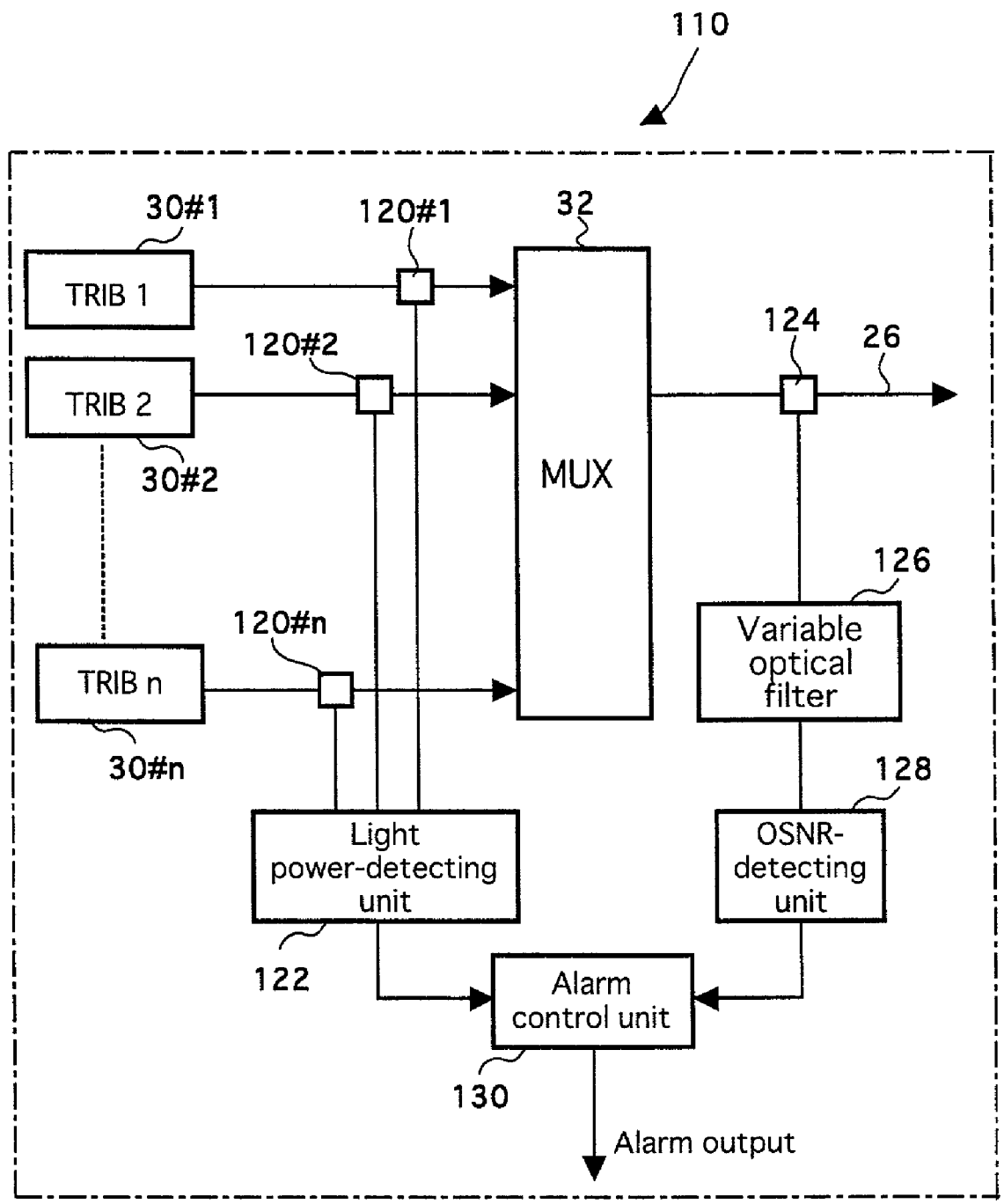
FIG. 12 is a block diagram showing the configuration of a first line terminal equipment employed in the wavelength-division-multiplexing communication system shown in FIG. 11.

FIG. 12 is a block diagram showing the configuration of the first line terminal equipment 110 employed in the wavelength-division-multiplexing communication system shown in FIG. 11. Configuration elements of the first line terminal equipment 110 which are virtually identical with those employed in the first line terminal equipment 22 shown in FIG. 3 are denoted by the same reference numerals as the latter. Each of couplers 120#i where i=1 to n splits an optical signal light received from the receiving unit 30#i into 2 optical signals. One of the 2 optical signals is supplied to the multiplexer 32 and the other is fed to a light-power-detecting unit 122. The light-power-detecting unit 122 has the following functions:

1: Detect the light power of a channel optical signal having a wavelength λi as output by each of the couplers 120#i where i=1 to n.

2: Compare the light power of the channel optical signal having the wavelength λi with a threshold value and form the following judgments:

2-(i): If the light power exceeds the threshold value, the light-power-detecting unit 122 outputs a signal with a logic value of typically 0 indicating that the light power of the optical signal with the wavelength λi is normal.

2-(ii): If the light power does not exceed the threshold value, on the other hand, the light-power-detecting unit 122 outputs a signal with a logic value of typically 1 indicating that the light power of the optical signal with the wavelength λi is abnormal.

Figure 13:
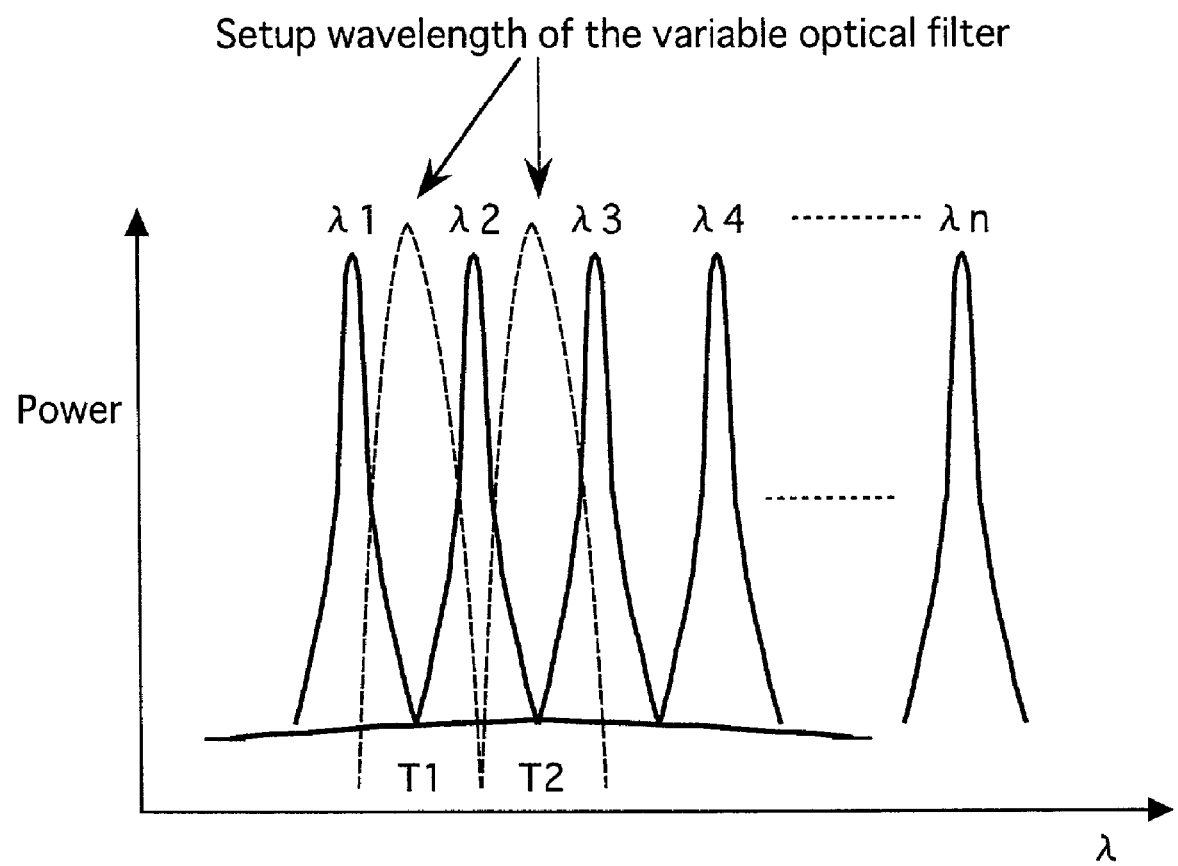
FIG. 13 is an explanatory diagram referred to in a description of a method for detecting an OSNR.

A coupler 124 splits an optical signal light received from the multiplexer 32 into 2 optical signals. One of the 2 optical signals is supplied to the optical transmission line 26 and the other is fed to a variable optical filter 126. The variable optical filter 126 is a filter with an adjustable pass band. The variable optical filter 126 passes on a wavelength component of the WDM signal light output by the coupler 124 to an OSNR-detecting unit 128 if the wavelength component is in the pass band of the variable optical filter 126. The pass band of the variable optical filter 126 is typically adjusted by the OSNR-detecting unit 128. Thus, only one variable optical filter 126 common to all channels is required in this embodiment. The variable optical filter 126 is switched properly from one channel to another. It should be noted, however, that the variable optical filter 126 can also be provided for each channel. For each of wavelengths λi where i=1 to n, the OSNR-detecting unit 128 measures the OSNR of an optical signal to form a judgment as to whether the OSNR is normal or abnormal, and generates a signal indicating that the OSNR is normal or abnormal accordingly. As techniques of forming a judgment as to whether the OSNR is normal or abnormal, the following 3 methods are adopted:

1: First Method of Forming a Judgment as to whether the OSNR is Normal or Abnormal FIG. 13 is an explanatory diagram used for describing a first method of forming a judgment as to whether the OSNR is normal or abnormal. This first method is a technique based on the fact that, for any channel, a high-level noise included in an optical signal will be indicated by an abnormal OSNR of the optical signal while a low-level noise included in an optical signal will be indicated by an normal OSNR of the optical signal. This method is implemented in accordance with the following procedure:

1: Measure the noise level for a channel provided for transmission of an optical signal for each of the wavelengths λi where i=1 to n.

2: Compare the noise level for a channel provided for transmission of an optical signal having any of the wavelengths λi where i=1 to n with a threshold value to form a judgment as to whether the OSNR of the optical signal of the channel is normal or abnormal.

To put it concretely, the method is implemented as follows:

1: For a channel provided for transmission of an optical signal with the wavelength λi, set the variable optical filter 126 at a pass band for the wavelength of a channel noise to be measured. The pass band of the variable optical filter 126 can be one of the following:

1-(i): A pass band with a peak-output wavelength coinciding with an intermediate wavelength (λi+λi+1)/2 between the wavelength λi and the wavelength λi+1.

1-(ii): A pass band with a peak-output wavelength coinciding with an intermediate wavelength (λi−1+λi)/2 between the wavelength λi−1 and the wavelength λi.

1-(iii): A pass band with 2 peak-output wavelengths coinciding with the intermediate wavelengths (λi+λi+1)/2 and the intermediate wavelength (λi−1+λi)/2 respectively.

As an example, assume that the pass band of the variable optical filter 126 is set for wavelength λ2 shown in FIG. 13. In this case, the variable optical filter 126 is set at pass band 1-(ii) represented by a left dashed curve with a peak T1 between wavelengths λ1 and λ2, pass band 1-(i) represented by a right dashed curve with a peak T2 between wavelengths λ2 and λ3 or pass band 1-(iii) having 2 peaks coinciding with T1 and T2 respectively. It should be noted that, for the maximum wavelength λ1, the variable optical filter 126 is set at a first pass band having a first peak-output wavelength coinciding with an intermediate wavelength between the wavelength λ1 and the wavelength λ2, a second pass band having a second peak-output wavelength coinciding with an intermediate wavelength (λ1−(λ2−λ1)/2) or a third pass band having 2 peak-output wavelengths coinciding with the first and second peaks respectively. For the minimum wavelength λn, the variable optical filter 126 can be set in same way as the maximum wavelength λ1.

2: Detect the level of a noise output for the wavelength λi by the variable optical filter 126 set at a pass band at step 1. It should be noted that the variable optical filter 126 may also be set at 2 pass bands for a channel provided for transmission of an optical signal having the wavelength λi. In this case, set the variable optical filter 126 at the 2 pass bands and detect the levels of the noises for the 2 pass bands. Then, find a sum or an average of the levels.

3: Compare the detected level of the noise with a threshold value for the wavelength λi and form a judgment as follows:

3-(i): If the detected noise level<the threshold value, determine that the OSNR for a channel provided for transmission of an optical signal with the wavelength λi is normal.

3-(ii) If the detected noise level≧the threshold value, on the other hand, determine that the OSNR for a channel provided for transmission of an optical signal with the wavelength λi is abnormal.

4: If the OSNR for a channel provided for transmission of an optical signal with a wavelength λi is found normal, output a signal having a logic value of typically 0 to indicate that the OSNR for the wavelength λi is normal. If the OSNR for a channel provided for transmission of an optical signal with a wavelength λi is found abnormal, on the other hand, output a signal having a logic value of typically 1 to indicate that the OSNR for the wavelength λi is abnormal.

5: Repeat steps 1 to 4 for all channels provided for transmission of optical signals having the wavelengths λi where i=1 to n.

Figure 14A:
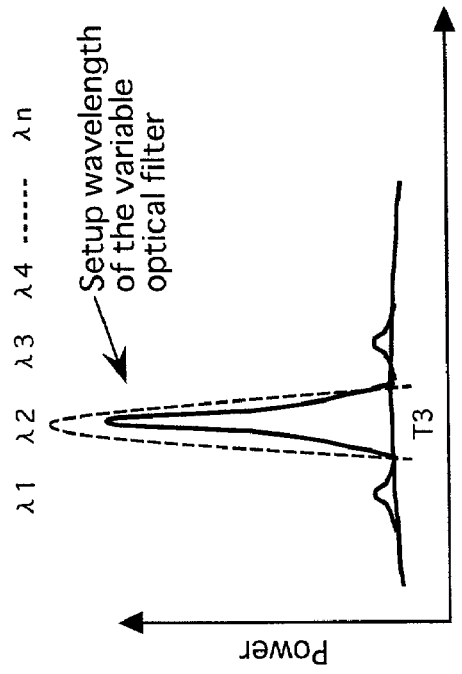
FIG. 14A is an explanatory diagram referred to in a description of a method for detecting an OSNR.
Figure 14C:
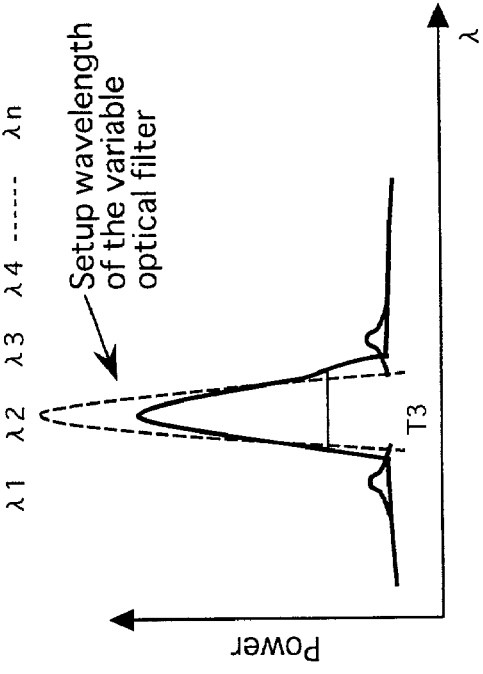
FIG. 14C is an explanatory diagram referred to in a description of a method for detecting an OSNR.
Figure 14B:
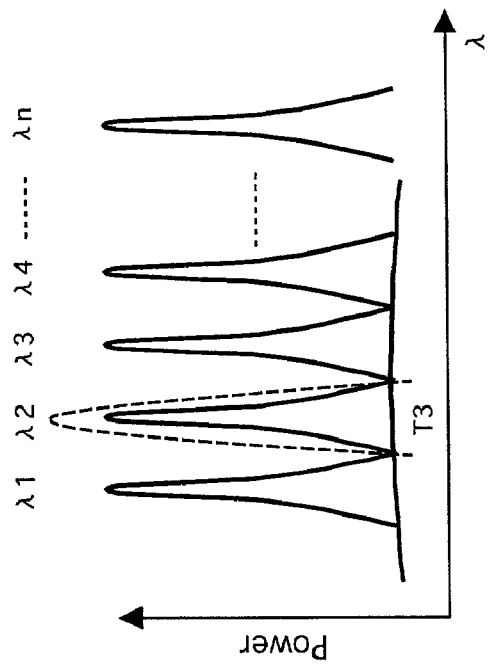
FIG. 14B is an explanatory diagram referred to in a description of a method for detecting an OSNR.
Figure 14D:
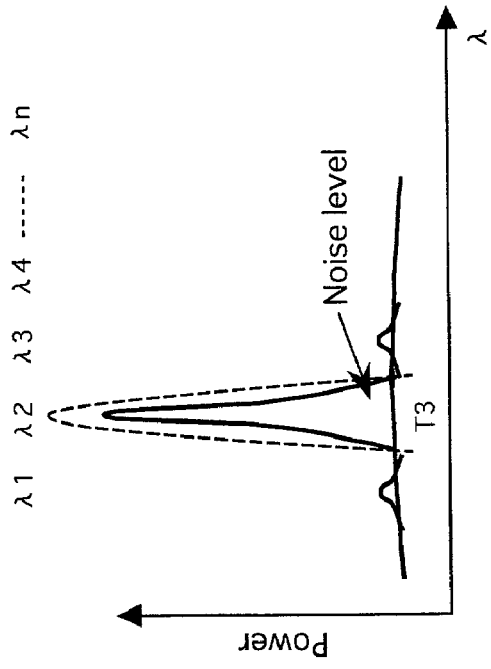
FIG. 14D is an explanatory diagram referred to in a description of a method for detecting an OSNR.

2: Second Method of Forming a Judgment as to whether the OSNR is Normal or Abnormal In accordance with the first method, the level of a noise for a wavelength λ is found by setting the variable optical filter 126 at a pass band having a peak-output wavelength coinciding with a wavelength adjacent to the wavelength λ as described above by referring to FIG. 13. In accordance with a second method, on the other hand, the level of a noise is measured in the so-called pre-in-service state to be described later. FIGS. 14A to 14D are explanatory diagrams used for describing the second method of forming a judgment as to whether the OSNR is normal or abnormal. The horizontal axis of each of the diagrams represents the wavelength λ and the vertical axis thereof represents the light power of a noise and a main power. To be more specific, FIG. 14A is a diagram showing a spectrum of optical signals prior to transmission of the signals through the variable optical filter 126. FIG. 14B is a diagram showing a spectrum of optical signals after the transmission of the signals through the variable optical filter 126 in a pre-in-service state with the signal down of channel 2. FIG. 14C is a diagram showing a spectrum of optical signals after the transmission of the signals through the variable optical filter 126 with the signal of channel 2 exhibiting a normal OSNR. FIG. 14D is a diagram showing a spectrum of optical signals after the transmission of the signals through the variable optical filter 126 with the signal of channel 2 exhibiting an abnormal OSNR. A pre-in-service state is a state prior to a delivery of the wavelength-division-multiplexing communication system to the customer. In a pre-in-service state, main signals do not exist and, thus, only noises exist. As described earlier, a noise may be introduced to a particular channel provided for transmission of an optical signal having a wavelength $\lambda i$ from a channel adjacent to the particular channel. Thus, in a pre-in-service state, a signal level of a particular channel provided for transmission of an optical signal having a wavelength $\lambda i$ after transmission through the variable optical filter 126 can be regarded as the level of a noise for the channel. The level of a noise for a channel in a pre-in-service state is used as a denominator while the same channel optical-signal level measured in an in-service state is used as a numerator in calculation of an OSNR. An in-service state is a state after the delivery of the wavelength-division-multiplexing communication system to the customer. In an in-service state, in addition to noises, main signals for channels also exist to be observed as optical signals. With the second method, an OSNR is found for a channel and compared with a threshold value to form a judgment as to whether the OSNR is normal or abnormal for each wavelength $\lambda i$. To put it concretely, the second method is implemented as follows:

1: Output noises for wavelengths $\lambda i-1$ and $\lambda i+1$ in a pre-in-service state where main signals for all channels including a channel provided for transmission of an optical signal having the wavelength $\lambda i$ do not exist. Typically, a switch is provided on the output side of each of the receiving units 30#i and the switches are all controlled to pass only the noises. In this case, the switch for the receiving unit 30#i is closed.

2: Set the variable optical filter 126 at the band pass for a channel provided for transmission of an optical signal having a wavelength $\lambda i$, that is, a band pass having a peak-output wavelength coinciding with the wavelength $\lambda i$. For example, set the variable optical filter 126 at the band pass for a channel provided for transmission of an optical signal having a wavelength $\lambda 2$, that is, a band pass T3 indicated by a dashed curve shown in FIG. 14B.

3: Measure the power of an optical signal output by the variable optical filter 126 with the variable optical filter 126 set at the band pass at step 2 as a noise level to be used as the denominator in calculation of an OSNR as described above. Since the power of an optical signal output by the variable optical filter 126 is measured in a pre-in service state where a main signal for a particular channel provided for transmission of an optical signal having the wavelength $\lambda 2$ does not exist, the result of measurement indicates the level of noises introduced from channels adjacent to the particular channel as shown in FIG. 14B, that is, noises having the wavelengths $\lambda 1$ and $\lambda 3$.

4: Repeat steps 1 to 3 for the channels provided for transmission of optical signals having all wavelengths $\lambda i$ where i=1 to n.

5: Set the variable optical filter 126 at the same band pass as that used at step 2 for a channel provided for transmission of an optical signal having a wavelength $\lambda i$ in an in-service state.

6: Measure the power of an optical signal output by the variable optical filter 126 with the variable optical filter 126 set at the band pass at step 5 as an optical-signal level to be used as the numerator in calculation of an OSNR at step 7 to be described later.

The calculated OSNR may have an abnormal value due to reasons described in 6-(i) and 6-(ii) below. As shown in FIG. 12, the couplers 120i where i=1 to n supply signal lights with wavelengths $\lambda i$ where i=1 to n respectively to the multiplexer 32 which is capable of controlling the light powers of main signals to a fixed value. An abnormal OSNR is caused by a high level of the noise, a low level of the main signal or both.

6-(i): In the first place, a relatively low level of the main signal results in an abnormal OSNR lower than a normal OSNR. For example, FIG. 14A is a diagram showing a spectrum of a WDM signal light prior to transmission of the WDM signal light through the variable optical filter 126 with all channels exhibiting a normal OSNR. FIG. 14C is a diagram showing a spectrum of the WDM signal light after the transmission of the WDM signal light through the variable optical filter 126 with the variable optical filter 126 set at the pass band of channel 2 exhibiting a normal OSNR. On the other hand, FIG. 14D is a diagram showing a spectrum of the WDM signal light after the transmission of the WDM signal light through the variable optical filter 126 with the variable optical filter 126 set at the pass band of channel 2 exhibiting an abnormal OSNR. It is obvious that a relatively low level of the main signal in the spectrum shown in FIG. 14D is the cause of the abnormal OSNR while a relatively high level of the main signal in the spectrum shown in FIG. 14C results in the normal OSNR. In other words, with the multiplexer 32 not controlling the light powers of the main signals to a fixed value, an abnormal OSNR of a channel indicates that the light power of the channel main signal leaving the variable optical filter 126 at is relatively small while a normal OSNR of a channel indicates that the light power of the channel main signal leaving the variable optical filter 126 is comparatively large.

6-(ii): In the second place, with the multiplexer 32 multiplexing signal lights supplied by the couplers 120i where i=1 to n at wavelengths $\lambda i$ where i=1 to n respectively as well as controlling the light powers of the main signals to a fixed value, an abnormal OSNR is caused by a relatively high noise level while a normal OSNR results from a relatively low noise level.

7: For a channel provided for transmission of an optical signal having the wavelength $\lambda i$, compute an OSNR as a ratio of the power or the optical level measured at step 6 to the noise level measured at step 3 for the pre-in-service state, and form a judgment as to whether or not the calculated OSNR is normal or abnormal. The formation of the judgment is based on characteristics of a noise and a main signal, which are included in an optical signal in the service implementation. In the case of service implementation 6-(i) where the light powers of the main signals are not controlled to a fixed value, for example, a calculated OSNR smaller than a threshold value is interpreted as an abnormal OSNR caused by a decreased power of the main signal at a wavelength $\lambda i$ for which the OSNR is calculated. On the other hand, a calculated OSNR greater than the threshold value is interpreted as a normal OSNR resulting from a normal power of the main signal at a wavelength $\lambda i$ for which the OSNR is calculated.

8: Output a signal having a logic value of typically 0 if the OSNR is found normal for a wavelength $\lambda i$, or output a signal having a logic value of typically 1 if the OSNR is found abnormal for a wavelength $\lambda i$.

9: Repeat steps 5 to 8 for all the wavelengths $\lambda i$ where i=1 to n.

3: Third Method of Forming a Judgment as to whether the OSNR is Normal or Abnormal

Figure 15:
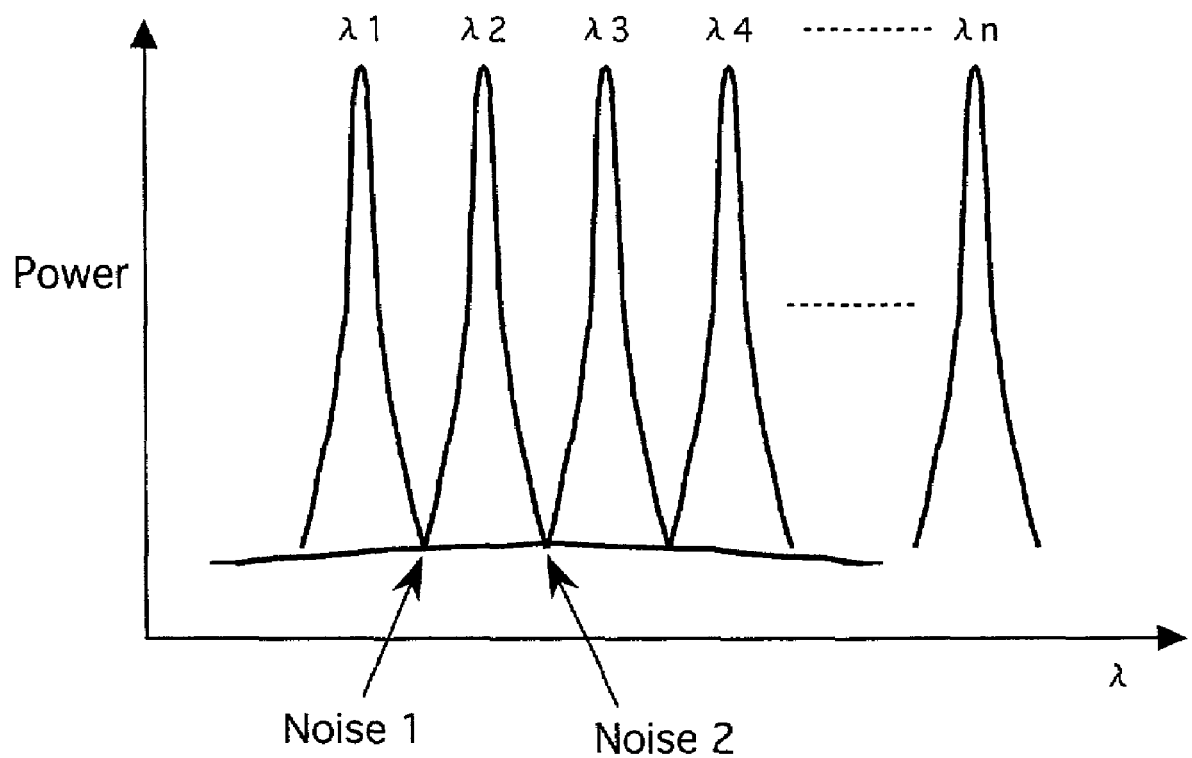
FIG. 15 is an explanatory diagram referred to in a description of a method for detecting an OSNR.

FIG. 15 is an explanatory diagram used for describing a third method of forming a judgment as to whether the OSNR is normal or abnormal. The third method is similar to the first method in that the level of a noise for a wavelength λ is found by setting the variable optical filter 126 at a pass band having a peak-output wavelength coinciding with a wavelength adjacent to the wavelength λ as described above by referring to FIG. 13. However, instead of merely measuring the level of each noise, this third method also includes calculation an OSNR for a channel provided for transmission of an optical signal having a wavelength λi as a ratio of the peak level of the main-signal power for the channel to the level of a noise included in the same channel. A small ratio is determined to be an abnormal OSNR. The method comprises the following procedural steps:

(i): Measure the level of a noise included a channel for a wavelength λi.
(ii): Measure the level of a main signal for the same channel.
(iii): Compute a ratio of the level of the main signal to the level of the noise and form a judgment as to whether the computed ratio represents a normal or abnormal OSNR.

To put it concretely, the method comprises the following steps:

1: Set the variable optical filter 126 at a pass band having a peak-output wavelength coinciding with a wavelength λi for a channel provided for transmission of an optical signal having the wavelength λi.
2: Measure the peak level of a signal output by the variable optical filter 126 having a pass band set at step 1.
3: Set the variable optical filter 126 at a pass band having a peak-output wavelength coinciding with a wavelength adjacent to the wavelength λi. Examples of the adjacent wavelength are an intermediate wavelength between the wavelengths λi and λi−1 and an intermediate wavelength between the wavelengths λi and λi+1.
4: Measure the level of a signal output by the variable optical filter 126 having a pass band set at step 3. Measure levels for pass bands each having a peak-output wavelength coinciding with one of such adjacent wavelengths and take an average of the measured levels. In the case of the wavelength λ2 shown in FIG. 15, for example, the adjacent wavelengths are an intermediate wavelength between the wavelengths λ2 and λ1 for measuring the level of noise 1 and an intermediate wavelength between the wavelengths λ2 and λ3 for measuring the level of noise 2. In the case of an edge wavelength such as λ1 or λn, however, only the level of noise 1 or the level of noise n−1 is measured.
5: For a wavelength λi, compute a ratio of the peak level measured at step 2 to the noise level at step 4 as an OSNR. If the gradient from the peak level for a wavelength λi to a level at a wavelength adjacent to the wavelength λ is relatively large, the ratio is also relatively large and can be interpreted as a normal OSNR. If the gradient from the peak level for a wavelength λi to a level at a wavelength adjacent to the wavelength λ is relatively small, on the other hand, the ratio is also relatively small and can be interpreted as an abnormal OSNR. The computed ratio is compared with a threshold value. A ratio greater than the threshold value is interpreted as a normal OSNR. On the contrary, a ratio smaller than the threshold value is interpreted as an abnormal OSNR.
6: Output a signal having a logic value of typically 0 if the OSNR is found normal for a wavelength λi, or output a signal having a logic value of typically 1 if the OSNR is found abnormal for a wavelength λi.
7: Repeat steps 1 to 6 for all the wavelengths λi where i=1 to n.

Figures 16, 17:
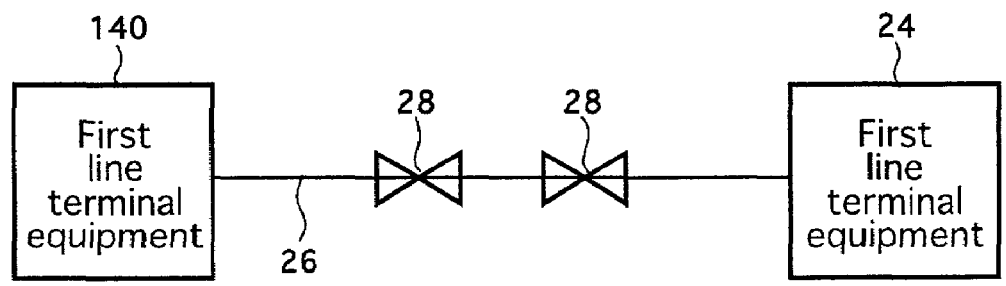
FIG. 16 is a table referred to in a description of alarm control.
FIG. 17 is a block diagram showing the configuration of a wavelength-division-multiplexing communication system implemented by a fourth embodiment of the present invention.

FIG. 16 is a table used for describing alarm control executed by an alarm control unit 130. The alarm control unit 130 outputs an alarm based on light-power detection results received from the light-power-detecting unit 122 for channels provided for transmission of optical signals having the wavelengths λi where i=1 to n and OSNR detection results received from the OSNR-detecting unit 128 for the channels provided for transmission of optical signals having the wavelengths λi where i=1 to n as follows:

7-(i): If the light power of an optical signal of a channel provided for transmission of the optical signal having the wavelength λi is found abnormal as evidenced by typically a light-power detection result set at 1 for the channel, the alarm control unit 130 outputs an alarm indicating that an input of the optical signal for the channel is down as shown on the bottom 2 lines of the table of FIG. 16.
7-(ii): If the light power of an optical signal of a channel provided for transmission of the optical signal having the wavelength λi is found normal as evidenced by typically a light-power detection set result at 0 for the channel but a result of OSNR detection has a logic value of 1 indicating an abnormal OSNR for the channel, the alarm control unit 130 outputs an alarm indicating signal degrade for the channel as shown on the second line of the table of FIG. 16.
7-(iii): If the results of light-power detection for channels provided for transmission of optical signals having the wavelengths λi where i=1 to n all have logic values of 0 indicating normal optical signals and the results of OSNR detection for the channels provided for transmission of the optical signals having the wavelengths λi all have logic values of 0 indicating normal OSNRs, the alarm control unit 130 outputs an OK message as shown on the top line of the table of FIG. 16.

The operation of the first line terminal equipment 110 shown in FIG. 11 is explained as follows. Each of the receiving units 30#i employed in the first line terminal equipment 110 where i=1 to n has functions to receive an optical signal from an input transmission line not shown in the figure and convert the optical signal into an electrical signal, insert the received signal converted into the electrical signal into the payload of a frame of the electrical signal, set an FAW for frame synchronization, an FEC for error correction and an ID of a channel assigned to the input transmission line in the header of the frame, convert the frame into an optical signal having a wavelength λi and output the optical signal to the coupler 120#i associated with the receiving unit 30#i.

Each of the couplers 120#i where i=1 to n splits the optical signal light received from the receiving unit 30#i for a channel provided for transmission of the optical signal having a wavelength λi into 2 optical signals. One of the 2 optical signals is supplied to the multiplexer 32 and the other is fed to a light-power-detecting unit 122. As described above, for each wavelength λi, the light-power-detecting unit 122 forms a judgment as to whether a light power is normal or abnormal, and outputs a signal showing the status of the light power to the alarm control unit 130. The multiplexer 32 multiplexes optical signals having wavelengths λi where i=1 to n and coming from the receiving units 30#i where i=1 to n to generate a WDM signal light and outputs the WDM signal light to the coupler 124. The coupler 124 splits an optical signal light received from the multiplexer 32 into 2 optical signals. One of the 2 optical signals is supplied to the optical transmission line 26 and the other is fed to the variable optical filter 126. The variable optical filter 126 is a filter with an adjustable pass band. The variable optical filter 126 passes on only the WDM signal light's wavelength component output by the coupler 124 at a wavelength in the pass band to the OSNR-detecting unit 128.

The pass band of the variable optical filter 126 is typically adjusted by the OSNR-detecting unit 128. For each of wavelengths λi where i=1 to n, the OSNR-detecting unit 128 measures the OSNR of an optical signal output by the variable optical filter 126 to form a judgment as to whether the OSNR is normal or abnormal by adopting one of the first to third methods described earlier, and outputs a signal indicating that the OSNR is normal or abnormal accordingly to the alarm control unit 130. It should be noted that, in the case of the second method, a noise level is measured in advance in a pre-in-service state for a channel provided for transmission of an optical signal having each of wavelengths λi where i=1 to n as described above. The alarm control unit 130 outputs an alarm based on light-power detection results received from the light-power-detecting unit 122 for channels provided for transmission of optical signals having the wavelengths λi where i=1 to n and OSNR-detection results received from the OSNR-detecting unit 128 for the channels provided for transmission of optical signals having the wavelengths λi where i=1 to n in accordance with judgments of the table shown in FIG. 16. As shown in the figure, the alarm may indicate an input down or signal degrade, or a normal message is displayed in place of an alarm. Since the input down and the signal degrade are distinguished from each other by different alarms, a person in charge of maintenance is capable of identifying the cause of an alarm with ease. Thus, the cause can be disposed quickly and, as a result, maintainability is improved. In accordance with the third embodiment described so far, the maintainability of a wavelength-division-multiplexing communication system can be improved.

Fourth Embodiment

FIG. 17 is a block diagram showing the configuration of a wavelength-division-multiplexing communication system implemented by a fourth embodiment of the present invention. Configuration elements of the fourth embodiment which are virtually identical with those employed in the third embodiment shown in FIG. 11 are denoted by the same reference numerals as the latter. Much like the first line terminal equipment 110 employed in the third embodiment shown in FIG. 11, a first line terminal equipment 140 also outputs an optical signal's alarm indicating an input down or signal degrade, or outputs a normal message used in place of an alarm for channels provided for transmission of optical signals having wavelengths λi where i=1 to n. However, the first line terminal equipment 140 is different from the first line terminal equipment 110 in that the first line terminal equipment 140 forms a judgment as to whether or not an optical signal has a certain quality by evaluating the OSNR of the optical signal by adding an ASE (Amplified Spontaneous Emission) to the WDM signal light including the optical signal in order to deliberately deteriorate the OSNR.

Figure 18:
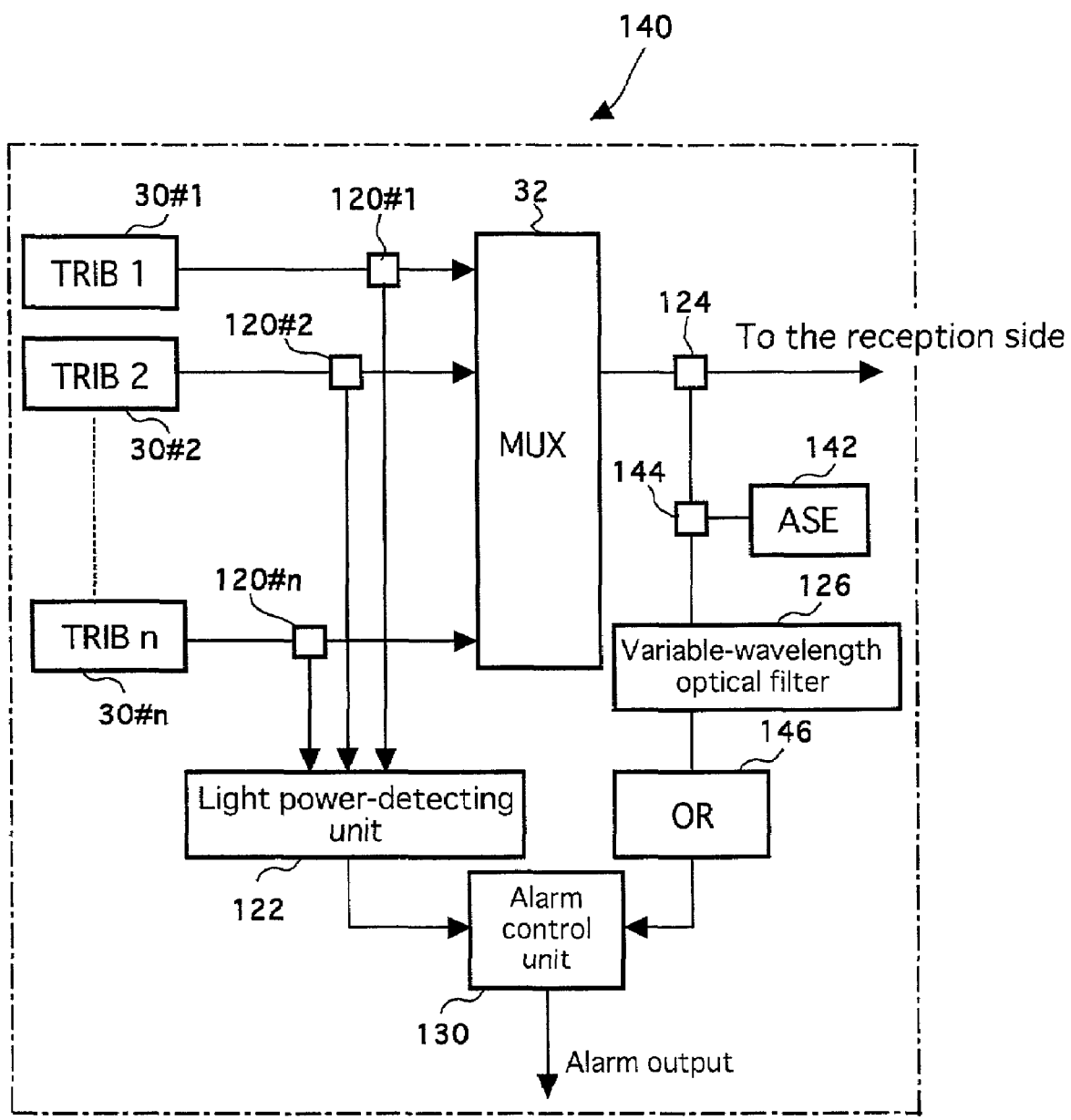
FIG. 18 is a block diagram showing the configuration of a first line terminal equipment employed in the wavelength-division-multiplexing communication system shown in FIG. 17.

FIG. 18 is a block diagram showing the configuration of the first line terminal equipment 140 employed in the wavelength-division-multiplexing communication system shown in FIG. 17. Configuration elements of the first line terminal equipment 140 which are virtually identical with those employed in the first line terminal equipment 110 shown in FIG. 12 are denoted by the same reference numerals as the latter. An ASE unit 142 employed in the first line terminal equipment 140 adds a noise having a predetermined level to an optical signal of a channel provided for transmission of the optical signal having each of the wavelengths λi where i=1 to n. A noise added to an optical signal is set at such a level that the optical signal's quality measured after the addition of the noise can be used as an indicator of the OSNR of the optical signal. The wavelength of a noise added by the ASE unit 142 to a signal light can be equal to the wavelength λi of the signal light or equal to an intermediate wavelength between the wavelength ζi+1 and the wavelength λi−1. The ASE unit 142 may output noises with a variety of wavelengths over the entire band simultaneously or synchronously with channel pass bands set for the variable optical filter 126.

An OR (Optical Receiver) 146 has the following functions:
1: Measure the quality of a signal light received from the variable optical filter 126 for each of channels provided for transmission of optical signals having the wavelengths λi where i=1 to n. The quality of a received signal light is a BER (Bit Error Ration) of the signal light or a Q value defined by Eq. (1) as follows:

$$Q = 20 \log_{10}(q) \qquad (1)$$

where $q = (\mu 1 - \mu 0)/(\delta 1 + \delta 0)$
 μ1=Average mark level
 μ2=Average space level
 δ1=Standard deviation of mark levels
 δ2=Standard deviation of space levels
2: Output an OSNR signal based on a judgment on a signal light's quality indicated by the BER or the Q value for each of channels provided for transmission of optical signals having the wavelengths λi where i=1 to n as follows:
2-(i): If the quality is higher than a predetermined level, output a signal having a logic value of typically 0 indicating that the OSNR of the channel provided for transmission of the signal light having the wavelength λi is normal.
2-(ii): If the quality is lower than the predetermined level, on the other hand, output a signal having a logic value of typically 1 indicating that the OSNR of the channel provided for transmission of the signal light having the wavelength λi is abnormal.

Thus, as described above, the fourth embodiment exhibits the same effects as the third embodiment.

Fifth Embodiment

Figure 19:
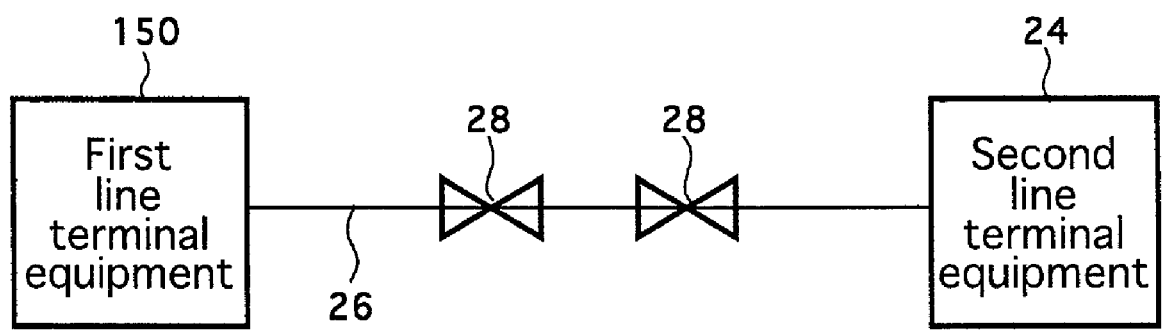
FIG. 19 is a block diagram showing the configuration of a wavelength-division-multiplexing communication system implemented by a fifth embodiment of the present invention.

FIG. 19 is a block diagram showing the configuration of a wavelength-division-multiplexing communication system implemented by a fifth embodiment of the present invention. Configuration elements of the fifth embodiment which are virtually identical with those employed in the third embodiment shown in FIG. 11 are denoted by the same reference numerals as the latter. Much like the first line terminal equipment 110 employed in the third embodiment shown in FIG. 11, a first line terminal equipment 150 also outputs an optical signal's alarm indicating an input down or signal degrade, or outputs a normal message used in place of an alarm for channels provided for transmission of optical signals having wavelengths λi where i=1 to n. However, the first line terminal equipment 150 is different from the first line terminal equipment 110 in that, for each of the channels provided for transmission of optical signals having wavelengths λi where i=1 to n, the first line terminal equipment 150 forms a judgment as to whether the OSNR of a signal light output by the receiving unit 30#i to the multiplexer 32 is normal or abnormal.

Figure 20:
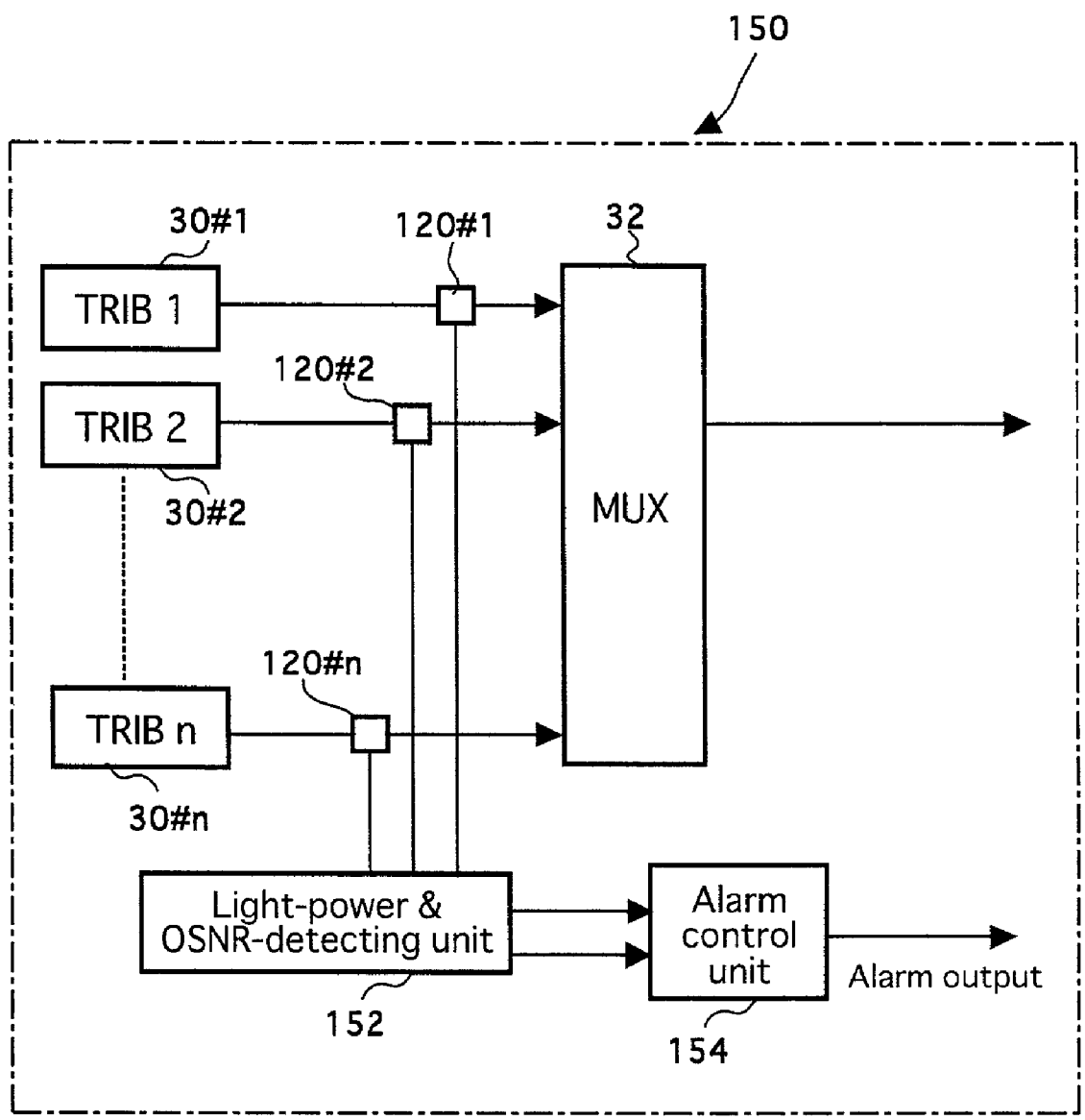
FIG. 20 is a block diagram showing the configuration of a first line terminal equipment employed in the wavelength-division-multiplexing communication system shown in FIG. 19.

FIG. 20 is a block diagram showing the configuration of the first line terminal equipment 150 employed in the wavelength-division-multiplexing communication system shown in FIG. 19. Configuration elements of the first line terminal equipment 150 which are virtually identical with those employed in the first line terminal equipment 110 shown in FIG. 12 are denoted by the same reference numerals as the latter. A light-power & OSNR-detecting unit 152 has the following functions:

1: Input an optical signal of a channel provided for transmission of the optical signal having a wavelength λi from each of the couplers 120#i where i=1 to n, and output a signal indicating whether the light power of the optical signal is normal or abnormal in the same way as the third embodiment.
2: Input an optical signal of a channel provided for transmission of the optical signal having a wavelength λi from each of the couplers 120#i where i=1 to n, and form a judgment as to whether the OSNR of the optical signal is normal or abnormal. The judgment as to whether the OSNR is normal or abnormal can be formed by adopting one of the 3 methods of the third embodiment or the method adopted by the fourth embodiment.

While the light-power & OSNR-detecting unit 152 can be provided for each of the couplers 120#i where i=1 to n so as to form a judgment as to whether the OSNR of the optical signal is normal or abnormal on a real-time basis for all channels, only one the light-power & OSNR-detecting unit 152 is provided for all the couplers 120#i where i=1 to n in this embodiment. In this case, the light-power & OSNR-detecting unit 152 includes optical switches for switching the light-power & OSNR-detecting unit 152 sequentially from one of the couplers 120#i where i=1 to n to another.

Figure 21:
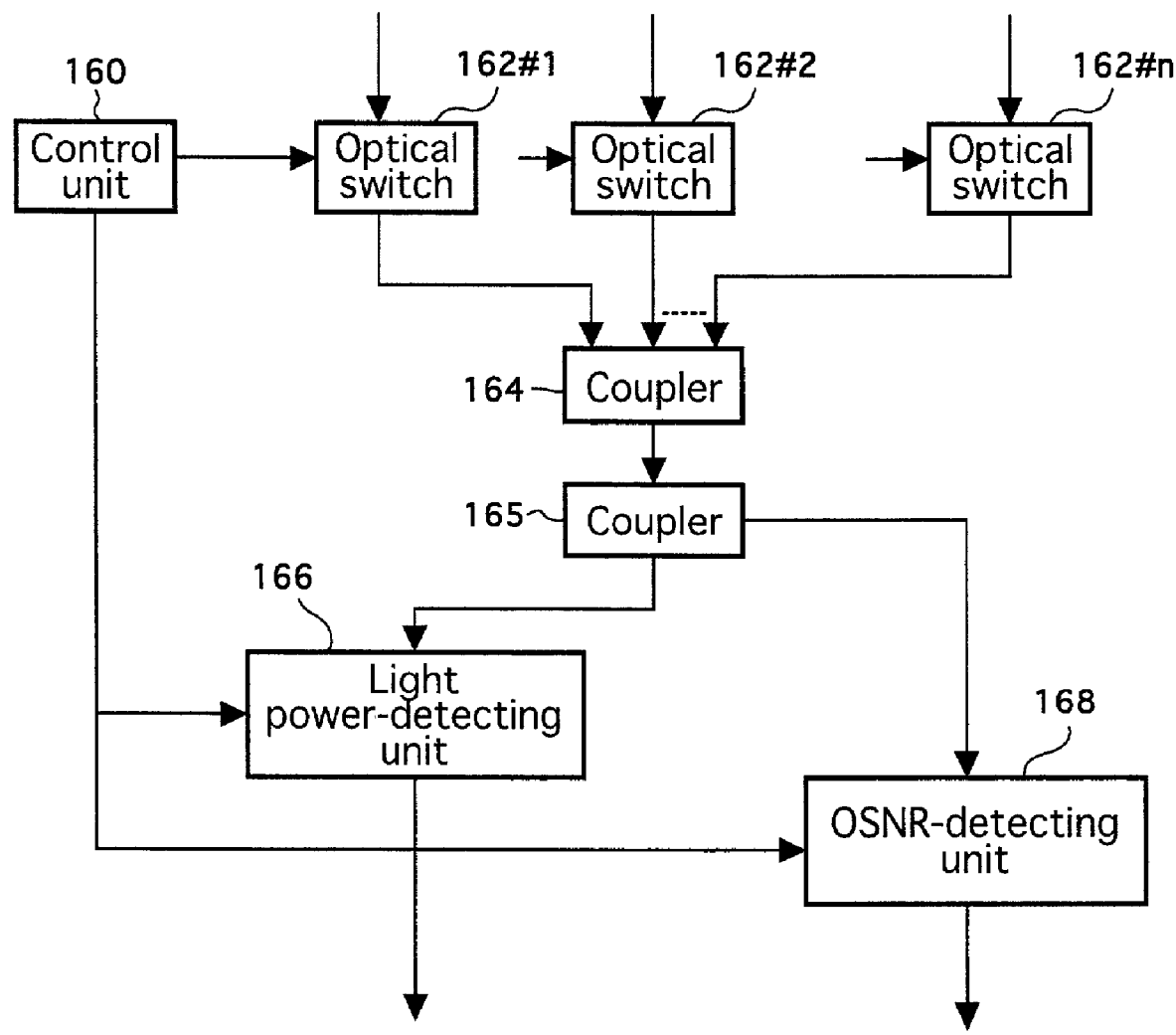
FIG. 21 is a block diagram showing the configuration of a light-power & OSNR-detecting unit employed in the first line terminal equipment shown in FIG. 20.

FIG. 21 is a block diagram showing the configuration of the light-power & OSNR-detecting unit 152 employed in the first line terminal equipment 150 shown in FIG. 20. As shown in FIG. 21, the light-power & OSNR-detecting unit 152 comprises a control unit 160, optical switches 162#i where i=1 to n, couplers 164 and 165, a light-power-detecting unit 166 and an OSNR-detecting unit 168. The control unit 160 has the following functions:

1: Control on/off switching operations of the optical switches 162#i where i=1 to n so that only one of the optical switches 162#i where i=1 to n is turned on at one time.
2: Inform the light-power-detecting unit 166 and the OSNR-detecting unit 168 of a channel associated with a turned-on one of the optical switches 162#i where i=1 to n.

Each of the optical switches 162#i where i=1 to n carries out a switching operation according to control executed by the control unit 160. The coupler 164 multiplexes signal lights output by the optical switches 162#i where i=1 to n. The coupler 165 splits a light output by the coupler 164 into 2 signal lights. One of the signal lights is supplied to the light-power-detecting unit 166 while the other signal light is fed to the OSNR-detecting unit 168. The light-power-detecting unit 166 measures the light power of a signal light received from the coupler 165 to form a judgment as to whether the light power of the signal light is normal or abnormal, and outputs a signal representing a result of the judgment. The signal light is a signal light of a channel informed by the control unit 160. On the other hand, the OSNR-detecting unit 168 measures the OSNR of a signal light received from the coupler 165 to form a judgment as to whether the OSNR of the signal light is normal or abnormal, and outputs a signal representing a result of the judgment. The signal light is a signal light of a channel informed by the control unit 160.

FIG. 22 is a table used for describing alarm control. An alarm control unit 154 shown in FIG. 20 outputs an alarm based on light-power-detection and OSNR-detection results received from the light-power & OSNR-detecting unit 152 for the channels provided for transmission of optical signals having the wavelengths λi where i=1 to n as follows:

(i): If the light power of an optical signal of a channel provided for transmission of the optical signal having the wavelength λi is found abnormal as evidenced by typically a light-power detection result set at 1 for the channel, the alarm control unit 154 outputs an alarm indicating that an input of the optical signal for the channel is down as shown on the bottom 2 lines of the table of FIG. 22.
(ii): If the light power of an optical signal of a channel provided for transmission of the optical signal having the wavelength λi is found normal as evidenced by typically a light-power detection result set at 0 for the channel but a result of OSNR detection has a logic value of 1 indicating an abnormal OSNR for the channel, the alarm control unit 154 outputs an alarm indicating signal degrade for the channel as shown on the second line of the table of FIG. 22.
(iii): If the results of light-power detection for channels provided for transmission of optical signals having the wavelengths λi where i=1 to n all have logic values of 0 indicating normal optical signals and the results of OSNR detection for the channels provided for transmission of the optical signals having the wavelengths λi all have logic values of 0 indicating normal OSNRs, the alarm control unit 154 outputs an OK message as shown on the top line of the table of FIG. 22.

Thus, the fifth embodiment exhibits the same effects as the third embodiment.

In the light-transmitting apparatus and the wavelength-division-multiplexing communication system, which are provided in accordance with the embodiments described above, it is possible to prevent another most likely misinterpreted input signal from being interpreted incorrectly as the input signal down due to an increased wavelength count accompanying a rising communication capacity even if the characteristics of a demultiplexer employed in a equipment on the receiving side are the same as the conventional one so that the maintainability of the wavelength-division-multiplexing communication system can be improved.

It should be noted that the present invention is not limited to the details of the preferred embodiments described above. Instead, the scope of the present invention is defined only by the following appended claims, and all changes and modifications falling within the scope of the claims are therefore to be embraced by the invention.

What is claimed is:

1. A light-transmitting apparatus for demultiplexing an input signal completing wavelength division multiplexing into signals of wavelength components with wavelengths different from each other and for transmitting each of said wavelength components through a transmission line provided for transmission of said wavelength components, said light-transmitting apparatus comprising:

a wavelength-count-detecting unit detecting the number of wavelengths of wavelength components included in said input signal and determining whether the number of wavelengths is normal or abnormal;

a plurality of extraction units provided for each of said wavelength components, said extraction units extracting an identifier set in each of said signals of said wavelength components;

a plurality of identifier-detecting units each associated with one of said extraction units and determining whether or not each of said identifiers extracted by said extraction units is normal; and a judgment unit judging whether or not each of the components of the input signal is down or each of said identifier is abnormal for each of said wavelength components on the basis of a detection result output by said wavelength-count-detecting unit and a detection result output by said identifier-detecting unit associated with said wavelength component, wherein each of said signals of said wavelength components is a frame signal and each said identifier is set in a predetermined position of said frame and identifies a channel.

2. A light-transmitting apparatus according to claim 1 wherein, if said wavelength-count-detecting unit outputs a normal result of detection but at least a particular one of said identifier-detecting units outputs an abnormal result of detection, said judgment unit determines that an identifier of one of said wavelength components that is associated with said particular identifier-detecting unit is abnormal.

3. A light-transmitting apparatus according to claim 2 wherein, if said wavelength-count-detecting unit outputs an abnormal result of detection, said judgment unit determines that an optical input of one of said wavelength components is down.

4. A light-transmitting apparatus for multiplexing input signals into a multiplexed signal and transmitting said multiplexed signal, said light-transmitting apparatus comprising:
a plurality of receiving units receiving said input signals from a plurality of transmission lines and for converting said input signals into optical signals having wavelengths different from each other;
a plurality of light-power-detecting units forming judgments as to whether or not light powers of said optical signals output by said receiving units are abnormal;
a multiplexing unit multiplexing said optical signals output by said receiving units;
an OSNR-detecting unit detecting signal-to-noise ratios of wavelength components included in a multiplexed signal output by said multiplexing unit and for forming a judgment as to whether or not the magnitude of a noise included in each of said wavelength components is abnormal; and
a judgment unit judging an error for each of said wavelength components on the basis of detection results received from said light-power-detecting units and a detection result received from said OSNR-detecting unit;
wherein said judgment unit judges the optical signal being down and outputs an alarm indicating that an input of the optical signal is down when said detection result of said light-power-detecting unit indicates the optical signal is abnormal, and judges the optical signal being degraded and outputs an alarm indicating that the optical signal is degraded when said detection result of said light-power-detecting unit indicates the optical signal is normal and said detection result of said OSNR-detecting unit regarding the optical signal corresponding to said wavelength component designates an abnormal signal-to-noise ratio, and wherein said alarm is displayed so that the optical signal being degraded and the input of the optical signal being down can be distinguished.

5. A light-transmitting apparatus according to claim 4, further comprising a variable optical filter passing on only said multiplexed signal's wavelength component having a wavelength in a pass band set in said variable optical filter, wherein said OSNR-detecting unit detects a signal-to-noise ratio of said wavelength component passed on by said variable optical filter.

6. A light-transmitting apparatus according to claim 5 wherein said OSNR-detecting unit detects said signal-to-noise ratio of any particular one of said wavelength components on the basis of a light power of a signal light output by said variable optical filter set at a pass band having a peak-output wavelength coinciding with an intermediate wavelength between a peak-output wavelength of a signal-light level of said particular wavelength component and a peak-output wavelength of a signal-light level of one of said wavelength components that is adjacent to said particular wavelength component.

7. A light-transmitting apparatus according to claim 5 wherein said OSNR-detecting unit detects said signal-to-noise ratio of any particular one of said wavelength components on the basis of a noise level and a light power of a signal light output during an in-service state by said variable optical filter set at a pass band coinciding with a wavelength band of said particular wavelength component where said noise level is defined as a light power of a signal light output prior to said in-service state by said variable optical filter set at said pass band coinciding with said wavelength band of said particular wavelength component.

8. A light-transmitting apparatus according to claim 5 wherein said OSNR-detecting unit detects said signal-to-noise ratio of any particular one of said wavelength components on the basis of:
a light power of a signal light output by said variable optical filter set at a pass band having a peak-output wavelength coinciding with an intermediate wavelength between a peak-output wavelength of a signal-light level of said particular wavelength component and a peak-output wavelength of a signal-light level of one of said wavelength components that is adjacent to said particular wavelength component; and
a light power of a signal light output by said variable optical filter set at a pass band having a peak-output wavelength coinciding with a peak-output wavelength of a signal-light level of said particular wavelength component.

9. A light-transmitting apparatus according to claim 5 wherein said judgment unit determines that a particular one of said wavelength components has deteriorated if detection results output by said light-power-detecting unit for said wavelength components are normal but a detection result output by said OSNR-detecting unit for said particular wavelength component is abnormal.

10. A wavelength-division-multiplexing communication system including a first line terminal equipment, a second line terminal equipment, a plurality of transmission paths connected to a receiving side of said first line terminal equipment and an optical transmission line connecting said first line terminal equipment to said second line terminal equipment, said wavelength-division-multiplexing communication system comprising:
a plurality of receiving units provided in said first line terminal equipment and receiving input signals having wavelengths different from each other from said respective transmission paths and outputting wavelength components each generated at one of said wavelengths to include an identifier;
a multiplexing unit provided in said first line terminal equipment and multiplexing signal lights representing said wavelength components output by said receiving units to generate a wavelength-division-multiplexed signal and for transmitting said wavelength-division-multiplexed signal to said second line terminal equipment through said optical transmission line;
a wavelength-count-detecting unit provided in said second line terminal equipment and detecting the number of wavelengths of wavelength components included in said wavelength-division-multiplexed signal received from said first line terminal equipment through said optical transmission line;

a demultiplexing unit provided in said second line terminal equipment and used for demultiplexing said wavelength-division-multiplexed signal received from said first line terminal equipment through said optical transmission line into said wavelength components and for outputting said wavelength components to output terminals;

a plurality of extraction units provided for each of said wavelength components in said second line terminal equipment, said extraction units extracting said identifier set in each of said wavelength components;

a plurality of identifier-detecting units each associated with one of said extraction units and determining whether or not each said identifier extracted by said extraction units is normal; and a judgment unit provided in said second line terminal equipment judging whether or not an optical signal is down or said identifier is abnormal for each of said wavelength components on the basis of a detection result output by said wavelength-count-detecting unit and a detection result output by said identifier-detecting unit associated with said wavelength component, wherein each of said signals of said wavelength components is a frame signal and each said identifier is set in a predetermined position of said frame and identifies a channel.

11. A method of transmitting light, comprising:

detecting a number of wavelengths included in an input signal;

determining whether the number of wavelengths is normal;

storing an identifier set in a wavelength component associated with each wavelength in a predetermined position for each wavelength;

extracting the identifier set in each of the wavelength components;

determining whether or not said identifier set in said wavelength component associated with each wavelength is normal; and judging whether said wavelength component is missing based on the number of wavelengths or whether said identifier set is abnormal.

12. An apparatus for receiving a wavelength-division-multiplexed signal containing a plurality of wavelength components, comprising:

a demultiplexing unit demultiplexing the wavelength-division-multiplexed signal into each of said plurality of wavelength components having an identifier stored in a predetermined position in each of said plurality of wavelength components and outputting said wavelength components to output terminals;

a plurality of extraction units extracting an identifier stored in the predetermined position in each of the plurality of wavelength components;

a plurality of power detection units detecting a power of each of the plurality of wavelength components and judging whether or not an optical signal is down;

a plurality of determination units determining whether or not said identifier stored in the predetermined position in each of the plurality of wavelength components is normal; and a judgment unit judging said identifier associated with each of the plurality of wavelength components is abnormal when said determination unit associated with the corresponding wavelength component determines that the identifier is not normal and said power detection unit associated with the corresponding wavelength component judges that the optical signal is not down and outputting alarm information indicating said identifier is abnormal, and judging that an input signal associated with the corresponding wavelength component is down irrespective of a determination of the corresponding determination unit when the power detection unit associated with the corresponding wavelength component judges that the optical signal is down and outputting alarm information indicating the input signal is down, wherein each identifier identifies a channel associated with each of the wavelength components and is uniquely determined by the channel.

* * * * *